United States Patent
Zhang et al.

(10) Patent No.: US 12,135,609 B2
(45) Date of Patent: Nov. 5, 2024

(54) DATA RECONSTRUCTION METHOD AND APPARATUS, COMPUTER DEVICE, AND STORAGE MEDIUM AND SYSTEM

(71) Applicant: Huawei Technologies Co., Ltd., Guangdong (CN)

(72) Inventors: Jinyi Zhang, Hangzhou (CN); Ruliang Dong, Hangzhou (CN); Liang Chen, Shenzhen (CN); Qiang Xue, Chengdu (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 229 days.

(21) Appl. No.: 17/574,069

(22) Filed: Jan. 12, 2022

(65) Prior Publication Data

US 2022/0138046 A1    May 5, 2022

Related U.S. Application Data

(63) Continuation of application No. PCT/CN2019/097155, filed on Jul. 22, 2019.

(51) Int. Cl.
*G06F 11/10* (2006.01)
*G06F 3/06* (2006.01)
*G06F 11/14* (2006.01)

(52) U.S. Cl.
CPC ........ *G06F 11/1076* (2013.01); *G06F 3/0619* (2013.01); *G06F 3/064* (2013.01); *G06F 3/0659* (2013.01); *G06F 3/0689* (2013.01); *G06F 11/1092* (2013.01); *G06F 11/1435* (2013.01)

(58) Field of Classification Search
CPC .................................................. G06F 11/1076
See application file for complete search history.

(56) References Cited

U.S. PATENT DOCUMENTS

| | | | | |
|---|---|---|---|---|
| 5,623,595 A * | 4/1997 | Bailey | ................. | G06F 11/1076 714/764 |
| 7,512,862 B1 * | 3/2009 | Taylor | ................. | G06F 11/1076 714/755 |
| 8,156,405 B1 * | 4/2012 | Lumb | ................. | G06F 11/1092 714/770 |
| 8,386,834 B1 * | 2/2013 | Goel | .................... | G06F 11/108 714/6.22 |
| 2003/0126522 A1 * | 7/2003 | English | ............... | G06F 11/1076 714/E11.034 |

(Continued)

FOREIGN PATENT DOCUMENTS

| CN | 102981778 A | 3/2013 |
|---|---|---|
| CN | 104461394 A | 3/2015 |

(Continued)

*Primary Examiner* — Joseph D Torres
(74) *Attorney, Agent, or Firm* — WOMBLE BOND DICKINSON (US) LLP

(57) ABSTRACT

A method describes that a lost first block in a first stripe is directly reconstructed based on a first result obtained from a target quantity of storage devices, so that there is no need to read an unlost block in the first stripe. The first block may be reconstructed provided that the target quantity of first results are obtained. An amount of data of the first result is less than that of the unlost block in the first stripe. Therefore, a data transmission process occupies less network bandwidth, and this improves block reconstruction performance.

19 Claims, 27 Drawing Sheets

(56) References Cited

U.S. PATENT DOCUMENTS

| | | | |
|---|---|---|---|
| 2003/0126523 A1* | 7/2003 | Corbett | G06F 11/1076 |
| | | | 714/E11.034 |
| 2005/0091452 A1 | 4/2005 | Chen et al. | |
| 2005/0114727 A1* | 5/2005 | Corbett | G06F 11/1076 |
| | | | 714/6.21 |
| 2005/0144382 A1* | 6/2005 | Schmisseur | G06F 11/1088 |
| | | | 711/138 |
| 2008/0104445 A1* | 5/2008 | Ananthamurthy | G06F 11/1088 |
| | | | 711/E12.001 |
| 2013/0173956 A1 | 7/2013 | Anderson | |
| 2013/0173996 A1 | 7/2013 | Anderson et al. | |
| 2017/0206135 A1* | 7/2017 | Zeng | G06F 11/2094 |
| 2017/0322847 A1 | 11/2017 | Park | |
| 2018/0095676 A1 | 4/2018 | Zhao et al. | |
| 2019/0050289 A1* | 2/2019 | Kachare | H03M 13/154 |

FOREIGN PATENT DOCUMENTS

| | | |
|---|---|---|
| CN | 104536698 A | 4/2015 |
| CN | 104991740 A | 10/2015 |
| CN | 103975309 B | 8/2017 |
| CN | 107656832 A | 2/2018 |
| CN | 108334280 A | 7/2018 |
| WO | 2018112980 A1 | 6/2018 |

* cited by examiner

DATA RECONSTRUCTION METHOD AND APPARATUS, COMPUTER DEVICE, AND STORAGE MEDIUM AND SYSTEM

CROSS-REFERENCE TO RELATED APPLICATIONS

This is a continuation of International Patent Application No. PCT/CN2019/097155, filed on Jul. 22, 2019. The disclosure of the aforementioned application is hereby incorporated by reference in its entirety.

TECHNICAL FIELD

This application relates to the field of data storage technologies, and in particular, to a data reconstruction method and apparatus, a computer device, and a storage medium and system.

BACKGROUND

To improve a fault tolerance capability of a storage system, an erasure code (EC) and a disk striping technology are usually used to store to-be-stored data. Specifically, the to-be-stored data may be divided into a plurality of stripes. If a redundancy mode of the EC is N data blocks+M check blocks, each stripe includes N data blocks and M check blocks. N and M are integers greater than 0, and one data block and one check block may be considered as one block. N+M blocks included in each stripe may be stored on a plurality of storage devices. When any storage device loses a stored block, the storage device may restore the lost block to ensure that a block loss does not affect a normal service of the storage system.

The block may be reconstructed in the following process: For a stripe including a lost block, a control device in the storage system determines one lost block in the stripe, and sends N read requests to a storage device. Each read request is used to indicate to read one unlost block. After receiving each request, the storage device sends, to the control device, the unlost block indicated by each read request. After obtaining N blocks, the control device obtains the lost block based on a check matrix of the stripe and the obtained N blocks, and sends, through a write request, the obtained lost block to a storage device having the lost block. After receiving the write request, the storage device writes the lost block obtained by the control device into a storage node, to implement block reconstruction.

In the foregoing block reconstruction process, N read requests, the N blocks, and a reconstructed block need to be transmitted between the control device and a storage device that stores the stripe. A transmission process occupies a large quantity of network bandwidth. This affects block reconstruction performance.

SUMMARY

Embodiments of the present disclosure provide a data reconstruction method and apparatus, a computer device, and a storage medium and system, to improve block reconstruction performance. Technical solutions are as follows:

According to a first aspect, a data reconstruction method is provided. The method includes: determining a first block in a lost block in a first stripe, where a block in the first stripe is stored by a target quantity of storage devices;
    obtaining a first result from each of the target quantity of storage devices, where each first result is obtained after one of the target quantity of storage devices reads a stored valid block in the first stripe and performs calculation based on the stored valid block that is read; and
    reconstructing the first block based on the first result from the target quantity of storage devices.

According to an embodiment, the lost first block in the first stripe is directly reconstructed based on the obtained first result from the target quantity of storage devices, so that there is no need to read an unlost block in the first stripe. The first block may be reconstructed provided that the target quantity of first results are obtained. An amount of data of the first result is less than that of the unlost block in the first stripe. Therefore, a data transmission process occupies less network bandwidth and this improves block reconstruction performance.

In an embodiment, before the obtaining the first result from each of the target quantity of storage devices, the method further includes:
    splitting a check matrix of the first stripe into a first submatrix and the target quantity of second submatrices, where the first submatrix includes a column corresponding to the first block and a column corresponding to a second block, each second submatrix includes a column corresponding to at least one third block, stored on one storage device, in the first stripe, the second block is any block in the stored valid block in the first stripe, and the at least one third block is any block other than the second block in the stored valid block; and
    the reconstructing the first block based on the first results from the target quantity of storage devices includes:
    reconstructing the first block based on the first results from the target quantity of storage devices and the first submatrix.

In an embodiment, the reconstructing the first block based on the first results from the target quantity of storage devices and the first submatrix includes:
    summing the first results from the target quantity of storage devices, to obtain a summation matrix;
    obtaining a target block matrix based on an inverse matrix of the first submatrix and the summation matrix; and
    determining a first target row of the target block matrix as a reconstructed first block.

In an embodiment, before the reconstructing the first block based on the first results from the target quantity of storage devices and the first submatrix, the method further includes:
    sending a first obtaining request to a storage device of the target quantity of storage devices corresponding to each second submatrix, where the first obtaining request carries the second submatrix corresponding to the storage device, block information of a third block corresponding to each column of the second submatrix, and an identifier of a control device; and
    obtaining the first results returned by the target quantity of storage devices based on the first obtaining request.

Based on the foregoing embodiments, in addition, the first result sent by each storage device may be obtained provided that one first obtaining request is sent to each storage device, and there is no need to send a large quantity of read requests to each storage device. Therefore, this reduces CPU overheads of the control device and further reduces network bandwidth occupation, to improve the block reconstruction performance.

In a possible implementation, after the reconstructing the first block based on the first result from the target quantity of storage devices and the first submatrix, the method further includes:

sending a write request to a target storage device, where the write request carries the reconstructed first block and block information of the reconstructed first block, and the target storage device stores the reconstructed first block based on the block information of the reconstructed first block.

In an embodiment, before the sending the write request to the target storage device, the method further includes:

obtaining the second block from a storage device of the target quantity of storage devices that stores the second block;

reconstructing the second block based on the first results from the target quantity of storage devices and the first submatrix; and if a reconstructed second block is the same as the obtained second block, performing the sending the write request to the target storage device; otherwise, skipping performing the sending the write request to the target storage device, and preventing use of the first stripe.

Based on the foregoing embodiments, in addition, comparing whether content of the second block is the same as content of the reconstructed second block can avoid data silence. This improves system reliability.

In an embodiment, before the reconstructing the first block based on the first result from the target quantity of storage devices and the first submatrix, the method further includes:

sending a second obtaining request to the storage device of the target quantity of storage devices corresponding to each second submatrix, where the second obtaining request carries the second submatrix corresponding to the storage device, the block information of the third block corresponding to each column of the second submatrix, and an identifier of the target storage device;

sending a target reconstruction request to the target storage device, where the target reconstruction request carries the first submatrix, and the target reconstruction request indicates to reconstruct the first block based on the first submatrix; and receiving a reconstruction completion response sent by the target storage device, where the reconstruction completion response indicates that the first block is completely reconstructed.

Based on the foregoing embodiments, the first result sent by each storage device may be obtained provided that one second obtaining request is sent to each storage device, and there is no need to send the large quantity of read requests to each storage device. Therefore, this reduces the CPU overheads of the control device and further reduces the network bandwidth occupation, to improve the block reconstruction performance.

In an embodiment, before the determining the first block in the lost block in the first stripe, the method further includes:

receiving a first reconstruction request, where the first reconstruction request carries a storage medium identifier of an invalid storage medium on a storage device of the target quantity of storage devices;

determining at least one second stripe based on the storage medium identifier carried in the first reconstruction request;

determining any stripe in the at least one second stripe as the first stripe; and the determining the first block in the lost block in the first stripe includes:

determining any block in the lost block in the first stripe as the first block based on the storage medium identifier.

In an embodiment, before the determining the first block in the lost block in the first stripe, the method further includes:

receiving a second reconstruction request, where the second reconstruction request carries block information of at least one block lost in a storage medium on a storage device of the target quantity of storage devices;

determining at least one second stripe based on the block information, of the at least one block, carried in the second reconstruction request;

determining any stripe in the at least one second stripe as the first stripe; and the determining the first block in the lost block in the first stripe includes:

determining any block in the lost block in the first stripe as the first block based on the block information of the at least one block in the second reconstruction request.

In an embodiment, after the reconstructing the first block based on the first result from the target quantity of storage devices, the method further includes:

querying whether all lost blocks in the first stripe are completely reconstructed, where if not all the blocks are reconstructed, the foregoing block reconstruction process is still performed on any block that is not reconstructed; otherwise, the first stripe is completely reconstructed.

In an embodiment, before the determining a first block in a lost block in a first stripe, the method further includes:

querying whether a storage medium on a first storage device in the target quantity of storage devices is invalid; and the determining a first block in a lost block in a first stripe includes:

if the storage medium on the first storage device is invalid, determining, from a block stored in the invalid storage medium, the first block in the lost block in the first stripe.

In an embodiment, before the determining a first block in a lost block in a first stripe, the method further includes:

querying whether a block in a storage medium on a first storage device in the target quantity of storage devices is lost; and when at least one block is lost in any storage medium on the first storage device, determining, from the at least one block, the first block in the lost block in the first stripe.

In a possible implementation, before the reconstructing the first block based on the first result from the target quantity of storage devices and the first submatrix, the method further includes:

sending a third obtaining request to a storage unit of the storage device corresponding to each second submatrix, where the third obtaining request carries the second submatrix corresponding to the storage device, the block information of the third block corresponding to each column of the second submatrix, and an identifier of the first storage device; and obtaining the first result returned by a storage unit of the target quantity of storage devices based on the third obtaining request.

In an embodiment, before the reconstructing the first block based on the first result from the target quantity of storage devices and the first submatrix, the method further includes:

sending a fourth obtaining request to a storage unit of the storage device corresponding to each second submatrix, where the fourth obtaining request carries the second submatrix corresponding to the storage device, the block information of the third block corresponding to each column of the second submatrix, and an identifier of a primary storage device;

obtaining at least one target summation matrix from at least one primary storage device, where the at least one primary storage device is configured to manage the target quantity of storage devices, each target summation matrix is a sum of first results returned by at least one storage device based on the fourth obtaining request, and the at least one storage device is a device managed by one primary storage device; and the reconstructing the first block based on the first result from the target quantity of storage devices and the first submatrix includes:

reconstructing the first block based on the at least one target summation matrix and the first submatrix.

In an embodiment, the reconstructing the first block based on the at least one target summation matrix and the first submatrix includes:

summing the at least one target summation matrix to obtain a summation matrix;

obtaining the target block matrix based on the inverse matrix of the first submatrix and the summation matrix; and determining the first target row of the target block matrix as the reconstructed first block.

According to a second aspect, a data reconstruction method is provided. The method includes:

reading a valid block, in a first stripe, stored on a storage device, where the first stripe is stored on a target quantity of storage devices;

performing a calculation based on the read valid block to obtain a first result; and sending the first result to the target device, where the target device reconstructs a first block in a lost block in the first stripe based on the first result from the target quantity of storage devices.

In an embodiment, before the reading the valid block, in the first stripe, stored on the first storage device, the method further includes:

receiving an obtaining request, where the obtaining request carries a second submatrix corresponding to a storage device of the target quantity of storage devices, block information of a third block corresponding to each column of the second submatrix, and an identifier of the target device, the second submatrix includes a column corresponding to at least one third block, stored on a corresponding storage device, in the first stripe, the second block is any block in the valid block in the first stripe, and the third block is any block other than the second block in the valid block;

the reading the valid block, in the first stripe, stored on the first storage device includes:

reading the at least one third block stored on the corresponding storage device based on the block information of the third block corresponding to each column of the second submatrix; and the performing the calculation based on the read valid block to obtain the first result includes:

performing the calculation based on the at least one third block and the second submatrix, to obtain the first result.

In an embodiment, the performing the calculation based on the at least one third block and the second submatrix, to obtain the first result includes:

forming a block matrix by using the at least one third block, where each row of the block matrix is one third block; and multiplying the second submatrix by the block matrix to obtain the first result.

In an embodiment, the target device includes a control device, a target storage device, a first storage device, and at least one primary storage device. The first storage device is any device in the target storage device. The at least one primary storage device is configured to manage the target quantity of storage devices.

When the identifier of the target device is an identifier of the control device, the obtaining request is a first obtaining request and indicates to send the first result to the control device.

When the identifier of the target device is an identifier of the target storage device, the obtaining request is a second obtaining request and indicates to send the first result to the target storage device.

When the identifier of the target device is an identifier of the first storage device, the obtaining request is a third obtaining request and indicates to send the first result to the first storage device.

When the identifier of the target device is an identifier of the primary storage device, the obtaining request is a fourth obtaining request and indicates to send the first result to the primary storage device.

In an embodiment, before the receiving the obtaining request, the method further includes:

querying whether a storage medium on the storage device is invalid; and when the storage medium on the storage device is invalid, sending a first reconstruction request to the control device, where the first reconstruction request carries a storage medium identifier of the invalid storage medium on the storage device.

In an embodiment, before the receiving an obtaining request, the method further includes:

querying whether a block in a storage medium on the storage device is lost; and when at least one block in any storage medium on the storage device is lost, sending a second reconstruction request to the control device, where the second reconstruction request carries block information of the at least one block.

According to a third aspect, a data reconstruction method is provided. The method includes:

receiving a target reconstruction request, where the target reconstruction request carries a first submatrix, the target reconstruction request is used to indicate to reconstruct, based on the first submatrix, a first block in a lost block in a first stripe, the first submatrix includes a column corresponding to the first block in the lost block in the first stripe and a column corresponding to a second block, and the second block is any block in a valid block in the first stripe;

obtaining a first result returned by a target quantity of storage devices based on the second obtaining request, where the second obtaining request carries a second submatrix corresponding to a storage device, block information of a third block corresponding to each column of the second submatrix, and an identifier of a target storage device, a block in the first stripe is stored by the target quantity of storage devices, each first result is obtained after one of the target quantity of storage devices reads the stored valid block in the first stripe and performs calculation based on the read valid block, and the third block is any block other than the second block in the invalid block; and reconstructing the first block based on the first result from the target quantity of storage devices and the first submatrix.

In an embodiment, the reconstructing the first block based on the first result from the target quantity of storage devices and the first submatrix includes:

summing first results from the target quantity of storage devices, to obtain a summation matrix;

obtaining a target block matrix based on an inverse matrix of the first submatrix and the summation matrix; and determining a first target row of the target block as a reconstructed first block.

In an embodiment, after the reconstructing the first block based on the first result from the target quantity of storage devices and the first submatrix, the method further includes:

storing the reconstructed first block; and when the reconstructed first block is completely stored, sending a reconstruction completion response to a control device, where the reconstruction completion response is used to indicate that the first block is completely reconstructed.

In an embodiment, before the storing the reconstructed first block, the method further includes:

obtaining the second block from a storage device that stores the second block;

reconstructing the second block based on the first result from the target quantity of storage devices and the first submatrix; and if a reconstructed second block is the same as the obtained second block, performing the operation of storing the reconstructed first block; otherwise, skipping performing the operation of storing the reconstructed first block, and preventing use of the first stripe.

According to a fourth aspect, a block reconstruction apparatus is provided, configured to perform the foregoing data reconstruction method. Specifically, the block reconstruction apparatus includes a functional module configured to perform the data reconstruction method provided in any of the preceding embodiments or any one of the optional manners of the preceding embodiments.

According to a fifth aspect, a block reconstruction apparatus is provided, configured to perform the foregoing data reconstruction method. Specifically, the block reconstruction apparatus includes a functional module configured to perform the data reconstruction method provided in the second aspect or any one of the optional manners of the second aspect.

According to a sixth aspect, a block reconstruction apparatus is provided, configured to perform the foregoing data reconstruction method. Specifically, the block reconstruction apparatus includes a functional module configured to perform the data reconstruction method provided in the third aspect or any one of the optional manners of the third aspect.

According to a seventh aspect, a computer device is provided. The computer device includes a processor and a memory. The memory stores at least one instruction, and the instruction is loaded and executed by the processor to implement an operation performed in the data reconstruction method.

According to an eighth aspect, a storage medium is provided. The storage medium stores at least one instruction, and the instruction is loaded and executed by a processor to implement an operation performed in the data reconstruction method.

According to a ninth aspect, a data reconstruction method in a storage system is provided. The storage system includes a control device and one or more storage devices. Each of the one or more storage devices includes one hard disk, and the one or more storage devices are configured to store a block in a stripe generated by the control device. The method includes:

reading, by a first storage device, a valid block in the stripe stored on the one or more storage devices, and performing calculation based on the read valid block to obtain a first result;

sending, by the first storage device, the first result to the control device; and receiving, by the control device, the first result, and restoring a damaged block in the stripe based on the first result.

In an embodiment, the stripe is generated according to an erasure coding algorithm.

In an embodiment, the one or more storage devices are disk enclosures.

According to a tenth aspect, a storage system is provided. The storage system includes a control device and one or more storage devices. Each of the one or more storage devices includes one hard disk, and the one or more storage devices are configured to store a block in a stripe generated by the control device.

A first storage device is configured to: read a valid block in the stripe stored on the one or more storage devices and perform calculation based on the read valid block to obtain a first result, and send the first result to the control device.

The control device is configured to receive the first result, and restore a damaged block in the stripe based on the first result.

In an embodiment, the one or more storage devices are disk enclosures.

In an embodiment, the stripe is generated according to an erasure coding algorithm.

According to an eleventh aspect, a data reconstruction method in a storage system is provided. The storage system includes a plurality of storage devices. Each of the plurality of storage devices includes one or more hard disks, and the plurality of storage devices are configured to store a block in a stripe. The method includes:

reading, by a first storage device, a valid block in the stripe stored on the plurality of storage devices, and performing calculation based on the read valid block to obtain a first result; and restoring, by a second storage device in the plurality of storage devices, a damaged block in the stripe based on the first result.

In an embodiment, the second storage device is a primary storage device in the plurality of storage devices or a storage device, storing the damaged block in the stripe, in the plurality of storage devices.

The method further includes:

sending, by the first storage device, the first result to the second storage device, where the first storage device does not include the second storage device; and receiving, by the second storage device, the first result.

In an embodiment, the method further includes:

sending, by another storage device other than the second storage device in the first storage device, the first result to the second storage device, where the first storage device includes the second storage device; and receiving, by the second storage device, the first result sent by the another storage device.

According to a twelfth aspect, a storage system is provided. The storage system includes a plurality of storage devices. Each of the plurality of storage devices includes one or more hard disks, and the plurality of storage devices are configured to store a block in a stripe.

A first storage device is configured to: read a valid block in the stripe stored on the plurality of storage devices and perform calculation based on the read valid block to obtain a first result.

A second storage device in the plurality of storage devices is configured to restore a damaged block in the stripe based on the first result.

In an embodiment, the second storage device is a primary storage device in the plurality of storage devices or a storage device, storing the damaged block in the stripe, in the plurality of storage devices.

In an embodiment, the first storage device is configured to send the first result to the second storage device, and the first storage device does not include the second storage device.

The second storage device is configured to receive the first result.

BRIEF DESCRIPTION OF DRAWINGS

To describe technical solutions in embodiments of the present disclosure more clearly, the following briefly describes accompanying drawings required for describing the embodiments. Clearly, the accompanying drawings in the following description show merely some embodiments of the present disclosure, and a person of ordinary skill in the art may derive other drawings from these accompanying drawings without creative efforts.

DESCRIPTION OF EMBODIMENTS

To make objectives, technical solutions, and advantages of the present disclosure clearer, the following further describes implementations of the present disclosure in detail with reference to accompanying drawings.

Figure 1:
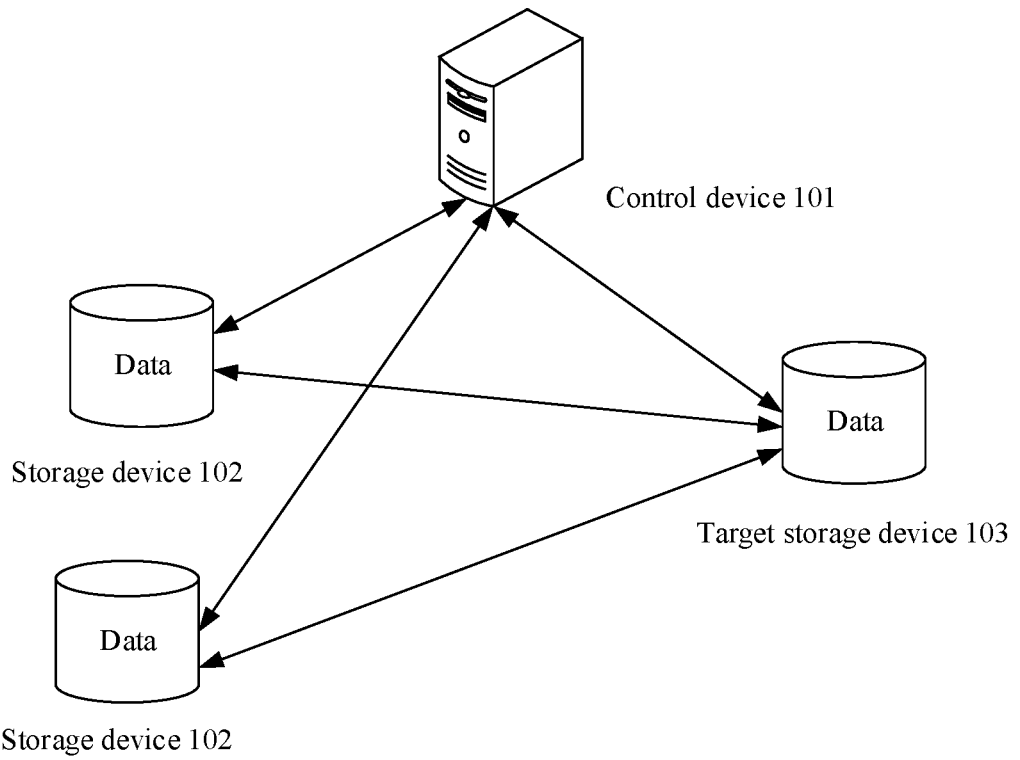
FIG. 1 is a schematic diagram of an implementation environment according to an embodiment of the present disclosure.

FIG. 1 is a schematic diagram of an implementation environment according to an embodiment of the present disclosure. Referring to FIG. 1, the implementation environment includes a control device 101, at least one storage device 102, and a target storage device 103. The control device 101, the storage device 102, and the target storage device 103 may be connected through an optical fiber or a cable.

The control device 101 is configured to write data into the storage device 102 and the target storage device 103. The control device 101 may be further configured to read data from the storage device 102 or the target storage device 103. The control device 101 may be further configured to reconstruct a lost block on the storage device 102.

The storage device 102 is configured to store data and output the stored data to the control device. The storage device 102 is further configured to send intermediate result data in a block reconstruction process to the control device 101 or the target storage device 103, so that the control device 101 or the target storage device 103 may directly reconstruct the lost block based on the intermediate result data sent by the at least one storage device 102.

The target storage device 103 is configured to store a reconstructed block. The target storage device 103 is further configured to reconstruct the lost block based on the intermediate result data sent by the at least one storage device 102. It should be noted that the target storage device 103 may be any storage device in the at least one storage device 102, or may be another storage device other than the at least one storage device 102.

The storage device 102 and the target storage device 103 each may further include at least one storage medium, and each storage medium is used to store the data written by the control device.

The control device 101, the storage device 102, and the target storage device 103 each may further include an input/output (I/O) unit, and the I/O unit is configured to send or receive a message.

It should be noted that, in some embodiments, the control device 101, the storage device 102, and the target storage device 103 each may include a storage unit and a control unit. The control unit may have a function of the control device 101, and the storage unit may have a function of the storage device 102 or the target storage device 103. In other words, the control device 101, the storage device 102, and the target storage device 103 each are a device including the storage unit and the control unit. The device has functions of the control device, the storage device, and the target storage device.

In some embodiments, at least one storage device including the storage unit and the control unit may be classified into a plurality of groups, and each group may include one primary storage device. The primary storage device in any group is configured to manage a storage device in any group. Each storage device may send an intermediate result in the block reconstruction process to the primary storage device. The primary storage device may sum the received intermediate results to obtain a sum value, and send the sum value to a device that reconstructs a block. Then the device that reconstructs the block restores a reconstructed block based on the received sum value. The primary storage device may be any device in the storage device in any group, or may be any device other than the storage device in any group. For example, one disk enclosure is considered as one group. The disk enclosure includes at least one storage device and one primary storage device, where the at least one storage device has the storage unit and the control unit. Alternatively, one availability zone (AZ) is considered as one group. The AZ includes the at least one storage device and the primary storage device, where the at least one storage device has the storage unit and the control unit.

Figure 2:
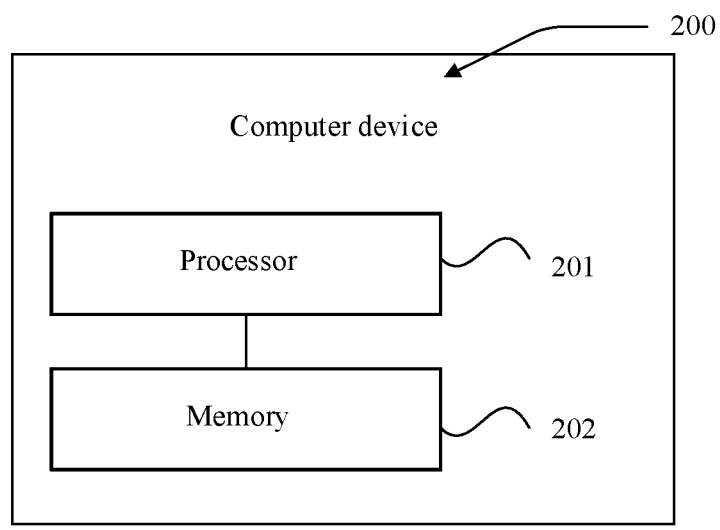
FIG. 2 is a schematic structural diagram of a computer device according to an embodiment of the present disclosure.

The control device, the storage device, and the target storage device may all be computer devices. FIG. 2 is a schematic structural diagram of a computer device according to an embodiment of the present disclosure. A component included in the computer device 200 may greatly differ because of different configurations or performance. The computer device 200 may include one or more processors (e.g., central processing units or CPUs) 201 and one or more memories 202. The memory 202 stores at least one instruction, and the at least one instruction is loaded and executed by the processor 201 to implement methods provided in the following method embodiments. Certainly, the computer device 200 may further have components such as a wired or wireless network interface, a keyboard, and an input/output interface, to perform input/output. The computer device 200 may further include another component configured to implement a device function. Details are not described herein again.

In an example embodiment, a computer-readable storage medium is further provided, for example, a memory including an instruction. The instruction may be executed by the processor of the computer device to complete a data reconstruction method in the following embodiments. For example, the computer-readable storage medium may be a read-only memory (ROM), a random access memory (RAM), a compact disc read-only memory (CD-ROM), a magnetic tape, a floppy disk, an optical data storage device, or the like.

The foregoing describes the implementation environment and the computer device. In addition, before storing a block in a stripe on at least one storage device based on an EC and a disk striping technology, the control device may allocate a stripe identifier to the stripe, to distinguish between different stripes. The stripe identifier may be a number of the stripe. The control device may further allocate block information, a block number, and a node identifier to each block in the stripe. The node identifier is used to indicate a storage device for storing any block. Block information of the any block may be a storage address of the any block. The storage address of the any block may include an internet protocol address (IP address) of the storage device that stores the any block and an offset address, of the any block, in a storage medium on the storage device. The storage address may also be a worldwide name (WWN). When the storage device that stores the any block includes a plurality of storage media, the block information of the any block may further include a medium identifier of a storage medium that stores the any block. The medium identifier may be a number of the storage medium. The stripe identifier, the block information, the node identifier, and the medium identifier are not specifically limited in this embodiment of the present disclosure.

After allocation is completed, the control device may associatively store information allocated to the stripe and each block in the stripe. In this way, subsequently the control device may determine, based on the stored information, a specific lost block in a specific stripe and a specific storage medium, on a specific storage device, storing the lost block. The control device may store, in an allocation table, the information allocated to the stripe and each block in the stripe, to implement associated storage. Certainly, the control device may store, in an association table, a block identifier of each block. The block identifier includes a data identifier or a check identifier. The data identifier is used to indicate that the block is a data block, and the check identifier is used to indicate that the block is a check block. After the control device stores, in the allocation table, the information allocated to the stripe and each block in the stripe, the control device may store each block based on information, corresponding to each block, in the allocation table.

For example, the association table is shown in Table 1. It can be learned from Table 1 that a stripe 1 includes a block 1 to a block p, where p is an integer greater than 1. The block 1 is a data block stored on a storage device 1, and the control device may store the block 1 on the storage device 1. The block p is a check block stored on a storage device 2, and the control device may store the block p on the storage device 2.

TABLE 1

| Stripe identifier | Block number | Block information | Node identifier | Block identifier |
|---|---|---|---|---|
| Stripe 1 | Block 1 | XXX | Storage device 1 | Data block |
|  | . . . | . . . | . . . | . . . |
|  | Block p | yyy | Storage device 2 | Check block |
| Stripe 2 | . . . | . . . | . . . | . . . |

In addition, before the control device stores each block in the first stripe, a storage device generates at least one check block based on a data block in the stripe and a check matrix through EC calculation or disk array (RAID) calculation. The check matrix H is of 2×(N+M). To be specific, the stripe includes N data blocks and M check blocks. A $j^{th}$ column of the check matrix H corresponds to a $j^{th}$ block in the stripe. In other words, each column of the check matrix corresponds to a block in the first stripe. N, M, and j each are a positive integer greater than 0.

An example in which original data is calculated in an EC 23+2 redundancy mode is used to describe a process of generating the check block. 23 is a quantity of data blocks, and 2 is a quantity of check blocks.

The control device stores a computer program in a local storage medium, and executes the computer program on a processor of the control device. The control device divides the original data into 23 blocks, namely, the 23 data blocks, and then arranges the 23 data blocks according to a specific order. The control device performs the EC/RAID calculation on the 23 data blocks to generate check data (the two check blocks).

In an embodiment, the control device may use a check matrix equation (1) to perform calculation.

$$H*x^T=0 \quad (1)$$

The check matrix H is stored in the computer program, and $x^T$ is a transposed matrix of a stripe matrix x. In a 23+2 configuration, the check matrix H may be represented by a formula (2), and the stripe matrix x may be represented by a formula (3).

$$H = \begin{pmatrix} a_{1,1} & \cdots & a_{1,j} & \cdots & a_{1,25} \\ a_{2,1} & \cdots & a_{2,j} & \cdots & a_{2,25} \end{pmatrix} \quad (2)$$

$$x = (x_1, x_2, \ldots, x_j, \ldots, x_{24}, x_{25}) \quad (3)$$

$a_{1,j}$ represents an element in the $j^{th}$ column of the first row of the check matrix H, $a_{2,j}$ represents an element in the $j^{th}$ column of the second row of the check matrix H, $x_j$ is used to represent $j^{th}$ block in the stripe, $x_1$ to $x_{23}$ are data blocks, and $x_{24}$ and $x_{25}$ are check blocks.

It should be noted that each column of the check matrix H corresponds to each column of the stripe matrix x. In other words, $x_j$ corresponds to $H_j$. $H_j$ is the $j^{th}$ column of the check matrix H. The data blocks $x_1$ to $x_{23}$ are the original data, namely, a known element, and the check matrix H is also a known element. Therefore, the control device may solve unknown check blocks $x_{24}$ and $x_{25}$ according to the formulas (1) to (3). A specific solving process is as follows:

The control device splits the check matrix H into two submatrices $H_N$ and $H_M$.

$$H_N = \begin{pmatrix} a_{1,1} & a_{1,2} & \cdots & a_{1,23} \\ a_{2,1} & a_{2,2} & \cdots & a_{2,23} \end{pmatrix}$$

$$H_M = \begin{pmatrix} a_{1,24} & a_{1,25} \\ a_{2,24} & a_{2,25} \end{pmatrix}$$

The control device may obtain a formula (4) according to the formula (1):

$$H_N*(x_1,x_2,\ldots,x_{23})^T+H_M*(x_{24},x_{25})^T=0 \quad (4)$$

The control device may obtain the check blocks $x_{24}$ and $x_{25}$ according to the formula (4):

$$(x_{24},x_{25})^T=-H_M^{-1}*H_N*(x_1,x_2,\ldots,x_{23})^T$$

After obtaining the check blocks $x_{24}$ and $x_{25}$, the control device may send the data blocks $x_1$ to $x_{23}$ in the stripe and the check blocks $x_{24}$ and $x_{25}$ to at least one storage device through an I/O unit. The at least one storage device may read a plurality of storage media (a magnetic disk, a solid-state drive, and the like) through the I/O unit. Then, the at least one storage device writes the data blocks or the check blocks into the storage medium. It should be noted that the foregoing stripe generation process is a process of generating the stripe according to an erasure coding algorithm.

In some specific environments, a block stored in a storage medium on a storage device may be lost. To ensure that a block loss does not affect a normal service, the control device may reconstruct the lost block. According to the foregoing process of solving the check block, when any block in the stripe is lost, the lost block may also be solved based on another block in the stripe. To simplify a calculation process in the control device, the foregoing solving process may be divided into a plurality of sub-processes, and the storage device completes calculation in the sub-processes. Then, the storage device sends calculation results of the sub-processes to the control device. Finally, the control device reconstructs the lost block based on the received calculation results.

In an embodiment of the present disclosure, a lost block is also referred to as a damaged block, namely, a block that cannot be read. Solving the lost block is restoring the damaged block. In this embodiment of the present disclosure, the storage device may perform a calculation based on a valid block in the stripe stored on the storage device, to obtain an intermediate result. Then the storage device sends the intermediate result to the control device, and the control device restores the damaged block based on the intermediate result. In another implementation, the storage device performs the calculation based on the valid block in the stripe stored on the storage device, to obtain the intermediate result. Then, a storage device that stores the damaged block restores the damaged block based on the intermediate result. Specifically, when the storage device that stores the damaged block also stores the valid block, another storage device that stores the valid block sends the intermediate result obtained through calculation to the storage device that stores the damaged block. The storage device that stores the damaged block restores the damaged block based on these intermediate result. When the storage device that stores the damaged block does not store the valid block, the storage device that stores the valid block sends the intermediate result to the storage device that stores the damaged block. The storage device that stores the damaged block restores the damaged block based on the intermediate result. In this way, the damaged block may be directly restored on the storage device that stores the damaged block, to reduce data exchange. In another implementation, the storage device performs the calculation based on the valid block in the stripe stored on the storage device, to obtain the intermediate result. Then, a primary storage device in the storage device restores the damaged block based on the intermediate result. Specifically, when the primary storage device also stores the valid block, another storage device that stores the valid block sends the intermediate result obtained through calculation to the primary storage device. The primary storage device restores the damaged block based on the intermediate result. When the primary storage device does not store the valid block, the storage device that stores the valid block sends the intermediate result to the primary storage device. The primary storage device restores the damaged block based on the intermediate result. In this embodiment of the present disclosure, the valid block is a block that can be read or an undamaged block in the stripe.

With reference to the foregoing description, an embodiment of the present disclosure provides a data reconstruction method in a storage system. The storage system includes a control device and one or more storage devices. Each of the one or more storage devices includes one hard disk, and the one or more storage devices are configured to store a block in a stripe generated by the control device. The method includes the following operations.

A first storage device reads a valid block in the stripe stored on the one or more storage devices, and performs calculation based on the read valid block to obtain a first result.

The first storage device sends the first result to the control device.

The control device receives the first result, and restores a damaged block in the stripe based on the first result.

In an embodiment, the stripe is generated according to an erasure coding algorithm.

In an embodiment, the one or more storage devices are disk enclosures.

Another embodiment of the present disclosure provides a data reconstruction method in a storage system. The storage system includes a plurality of storage devices. Each of the plurality of storage devices includes one or more hard disks, and the plurality of storage devices are configured to store a block in a stripe. The method includes the following operations.

A first storage device reads a valid block in the stripe stored on the plurality of storage devices, and performs calculation based on the read valid block to obtain a first result.

A second storage device in the plurality of storage devices restores a damaged block in the stripe based on the first result.

In an embodiment, the second storage device is a primary storage device in the plurality of storage devices or a storage device, storing the damaged block in the stripe, in the plurality of storage devices.

Further, the method includes the following operations.

The first storage device sends the first result to the second storage device, and the first storage device does not include the second storage device.

The second storage device receives the first result.

Further, another storage device other than the second storage device in the first storage device sends the first result to the second storage device, and the first storage device includes the second storage device.

The second storage device receives the first result sent by the another storage device.

In an embodiment, the plurality of storage devices are disk enclosures.

For the foregoing embodiments of the present disclosure, refer to description in the following embodiment. Details are not described herein again.

Figure 3A:
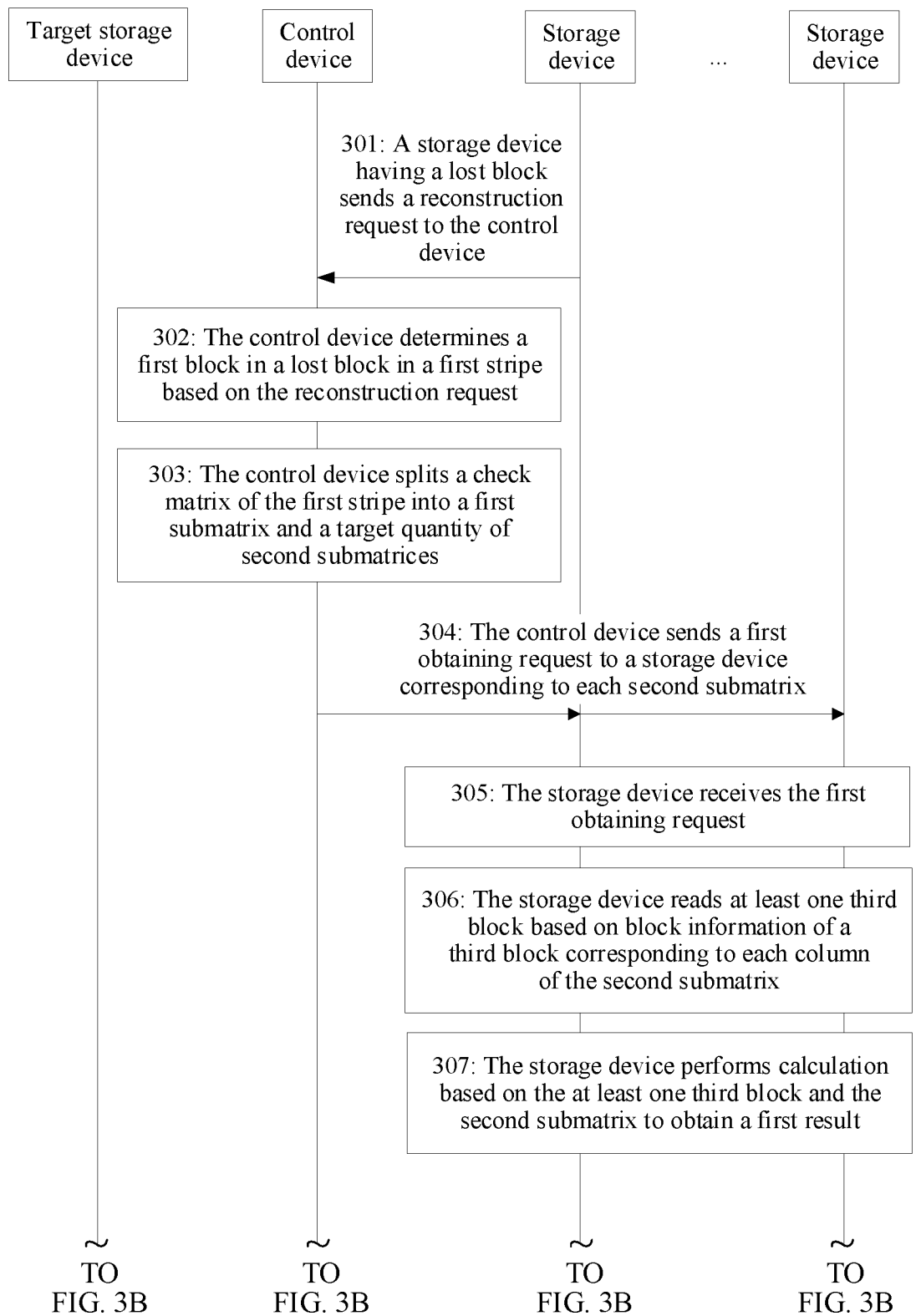
FIG. 3A and FIG. 3B are a flowchart of a data reconstruction method according to an embodiment of the present disclosure.
Figure 3B:
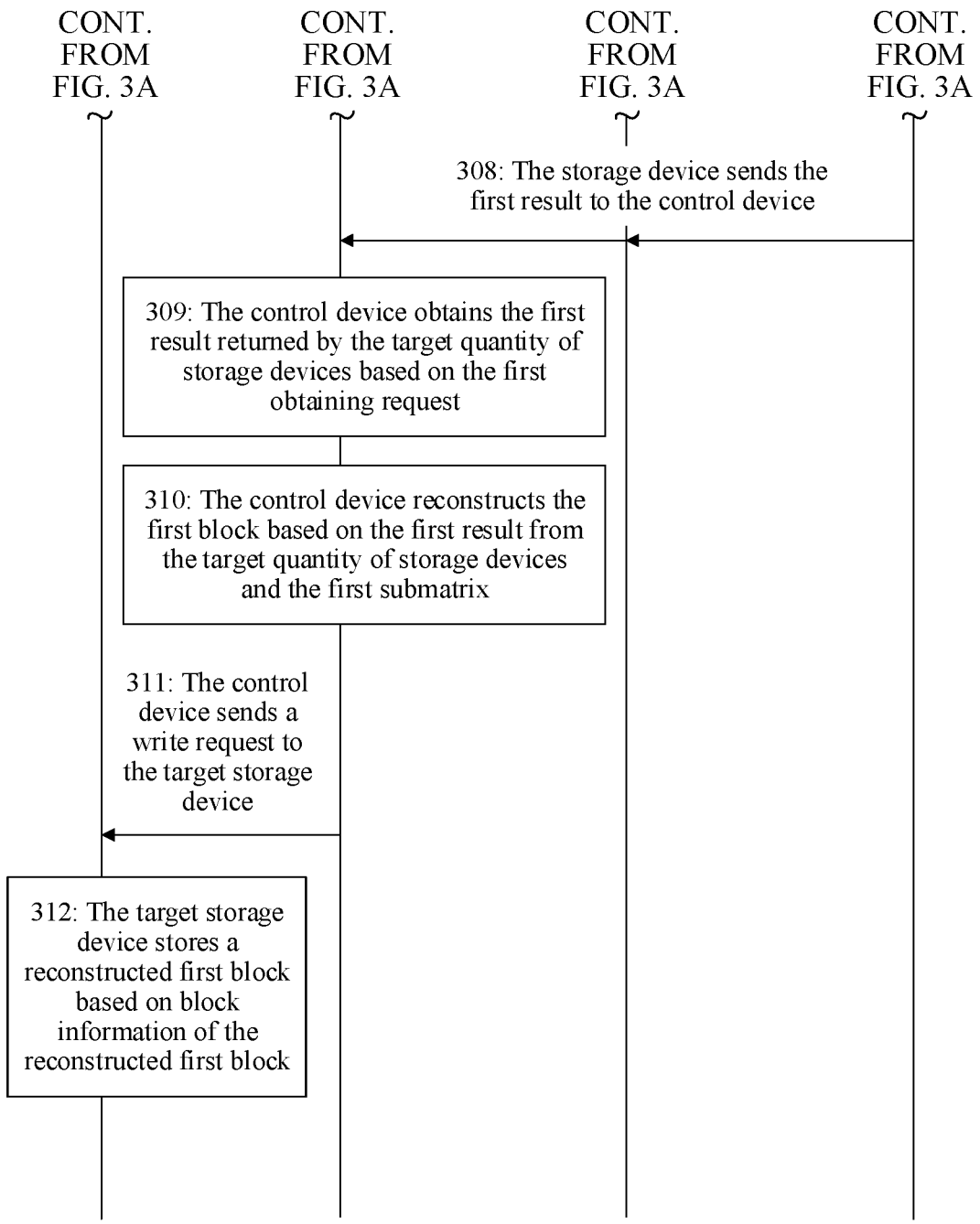

A process of reconstructing a lost block may be indicated through a flowchart of a data reconstruction method according to an embodiment of the present disclosure shown in FIG. 3A and FIG. 3B. A procedure of the method may include the following operations.

301: A storage device having a lost block sends a reconstruction request to a control device.

The reconstruction request is used to indicate to reconstruct the lost block, and the reconstruction request may include a first reconstruction request or a second reconstruction request. The first reconstruction request carries a storage medium identifier of an invalid storage medium on the storage device. When any storage medium on the storage device is invalid, the storage device may send, to the control device, the first reconstruction request that carries a medium identifier of the any storage medium. Therefore, before operation 301, the storage device may query whether a storage medium on the storage device is invalid. When the storage medium on the storage device is invalid, the storage device sends the first reconstruction request to the control device.

The second reconstruction request carries block information of at least one block lost in the storage medium on the storage device. When at least one block is lost because any storage medium on the storage device is partially invalid, the storage device may send the second reconstruction request to the control device. Therefore, before operation 301, the storage device may further query whether a block in the storage medium on the storage device is lost. When at least one block is lost in any storage medium on the storage device, the storage device sends the second reconstruction request to the control device.

302: The control device determines a first block in a lost block in a first stripe based on the reconstruction request, where a block in the first stripe is stored by a target quantity of storage devices.

The target quantity is a quantity of storage devices configured to store the block in the first stripe. The target quantity may be one or more, and is not specifically limited in this embodiment of the present disclosure. The first stripe is any stripe in which a block is lost.

For different reconstruction requests, the control device may implement operation 302 through processes shown in manner 1 and manner 2.

Manner 1: When the reconstruction request is the first reconstruction request, operation 302 may be implemented through a process shown in the following operations 21 to 23.

Operation 21: The control device determines at least one second stripe based on the storage medium identifier carried in the first reconstruction request.

The at least one second stripe is a stripe in which a block is lost. A block stored in a storage device identified by the storage medium identifier is a block in the at least one second stripe. Therefore, the control device determines the at least one second stripe based on the storage medium identifier carried in the first reconstruction request. In an embodiment, the control device may determine, from an association table, the at least one second stripe corresponding to the storage medium identifier.

Operation 22: The control device determines any stripe in the at least one second stripe as the first stripe.

The control device may randomly select a second stripe from the at least one second stripe as the first stripe. If a stripe identifier is a number, the control device may alternatively select a second stripe with a largest or smallest number as the first stripe. A manner of selecting the first stripe from the at least one second stripe is not specifically limited in this embodiment of the present disclosure.

Operation 23: The control device determines any block in the lost block in the first stripe as the first block based on the storage medium identifier.

The control device may first select, from the association table, at least one fourth block corresponding to the medium identifier of the storage medium and a stripe identifier of the first stripe. In this case, the at least one fourth block is a block, in the first stripe, lost in the storage medium. Then, the control device selects any block from the at least one fourth block as the first block. It should be noted that a manner in which the control device selects the first block from the at least one fourth block is similar to a manner in which the control device selects the first stripe from the at least one second stripe in operation 22. A manner of selecting the first block from the at least one block is not described in detail in this embodiment of the present disclosure.

Manner 2: When the reconstruction request is the second reconstruction request, operation 302 may be implemented through a process shown in the following operations 2A to 2C.

Operation 2A: The control device determines at least one second stripe based on the block information, of the at least one block, carried in the second reconstruction request.

The control device may determine, from an association table, the at least one second stripe corresponding to the block information of the at least one block.

Operation 2B: The control device determines any stripe in the at least one second stripe as the first stripe.

An implementation process of operation 2B is similar to that of operation 22. Herein, operation 2B is not described in detail in this embodiment of the present disclosure.

Operation 2C: The control device determines any block in the lost block in the first stripe as the first block based on the block information of the at least one lost block.

The control device may first select, from the association table, at least one fourth block corresponding to the block information of the at least one block and a stripe identifier of the first stripe. The control device may select one block from the at least one fourth block as the first block. In operation 23, determining the first block from the at least one fourth block is described. The determining the first block from the at least one fourth block is not described herein again.

303: The control device splits a check matrix of the first stripe into a first submatrix and the target quantity of second submatrices, where the first submatrix includes a column corresponding to the first block and a column corresponding to a second block, each second submatrix includes a column corresponding to at least one third block, stored on one storage device, in the first stripe, the second block is any block in a valid block in the first stripe, and the third block is any block other than the second block in the valid block.

To divide a process of solving the first block, the control device may divide the check matrix of the first stripe through operation 303. The control device may split and obtain the column corresponding to the first block and the column corresponding to the second block in the check matrix, to form the first submatrix, namely, a to-be-solved matrix. The control device may form a parameter matrix by using the column corresponding to the third block in the check matrix. Then, the control device divides the parameter matrix into the target quantity of second submatrices based on the third block stored on the target quantity of storage devices. One second submatrix corresponds to one storage device, and each column in one second submatrix corresponds to one third block stored on a corresponding storage device.

It should be noted that, in this embodiment of the present disclosure, an example is used for description. In this example, the first stripe includes blocks 1 to 25. The blocks 1 to 23 are data blocks, and the block 24 and the block 25 are check blocks. The first block is the block 1, the second block is the block 25, and the blocks 2 to 24 are third blocks.

Figure 4A:
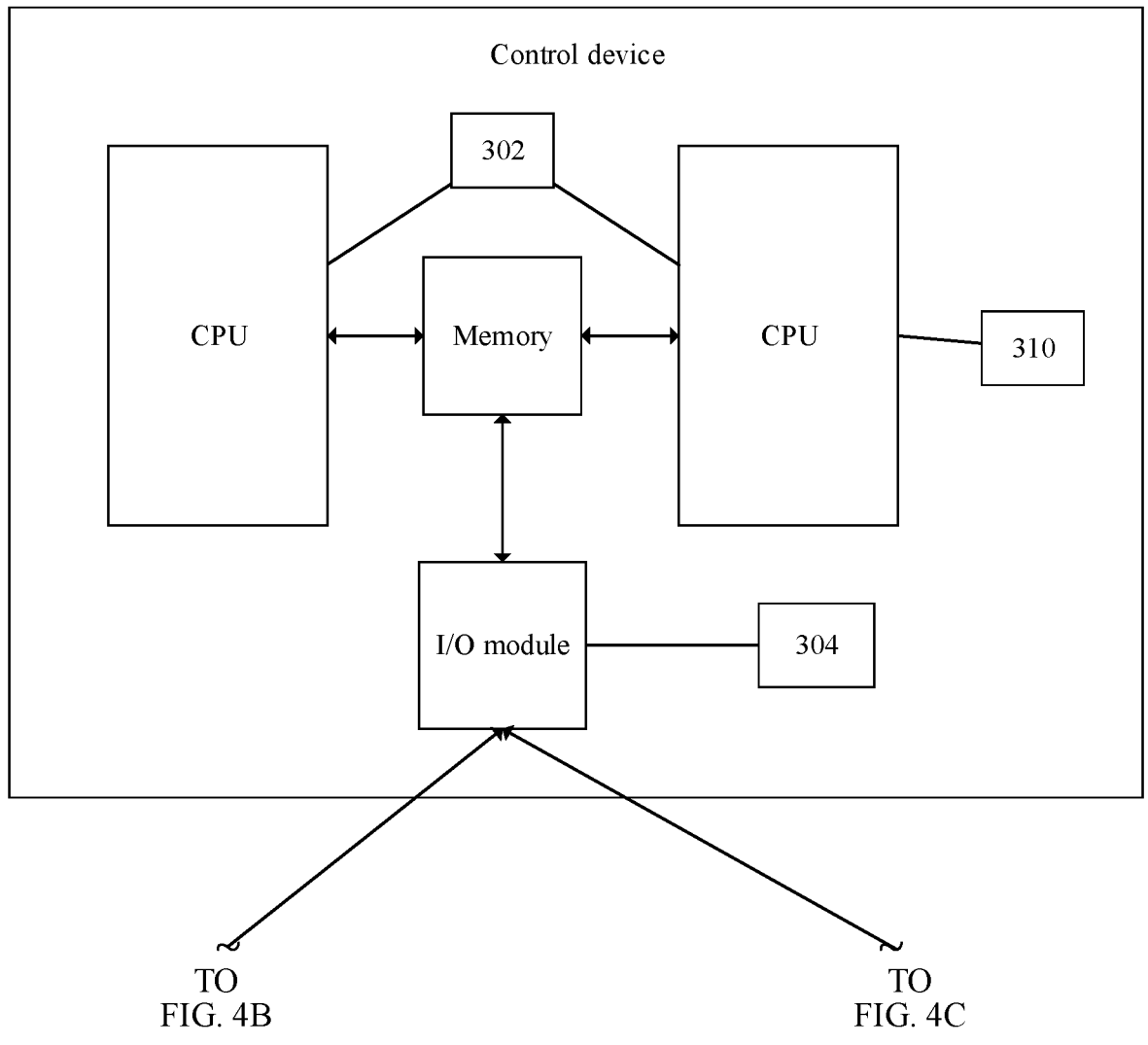
FIG. 4A, FIG. 4B, and FIG. 4C are a schematic diagram of a block reconstruction process according to an embodiment of the present disclosure.
Figure 4B:
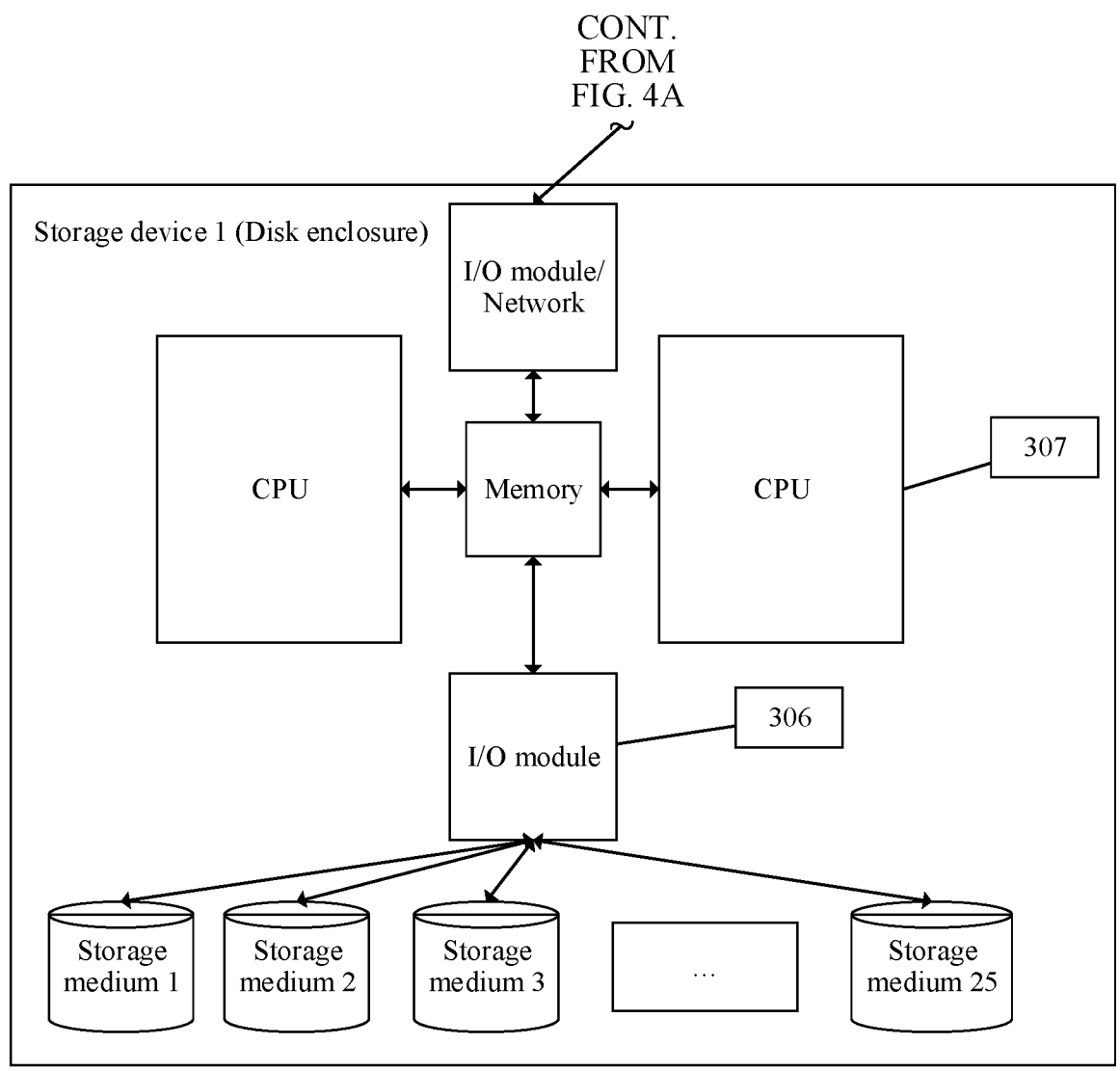
Figure 4C:
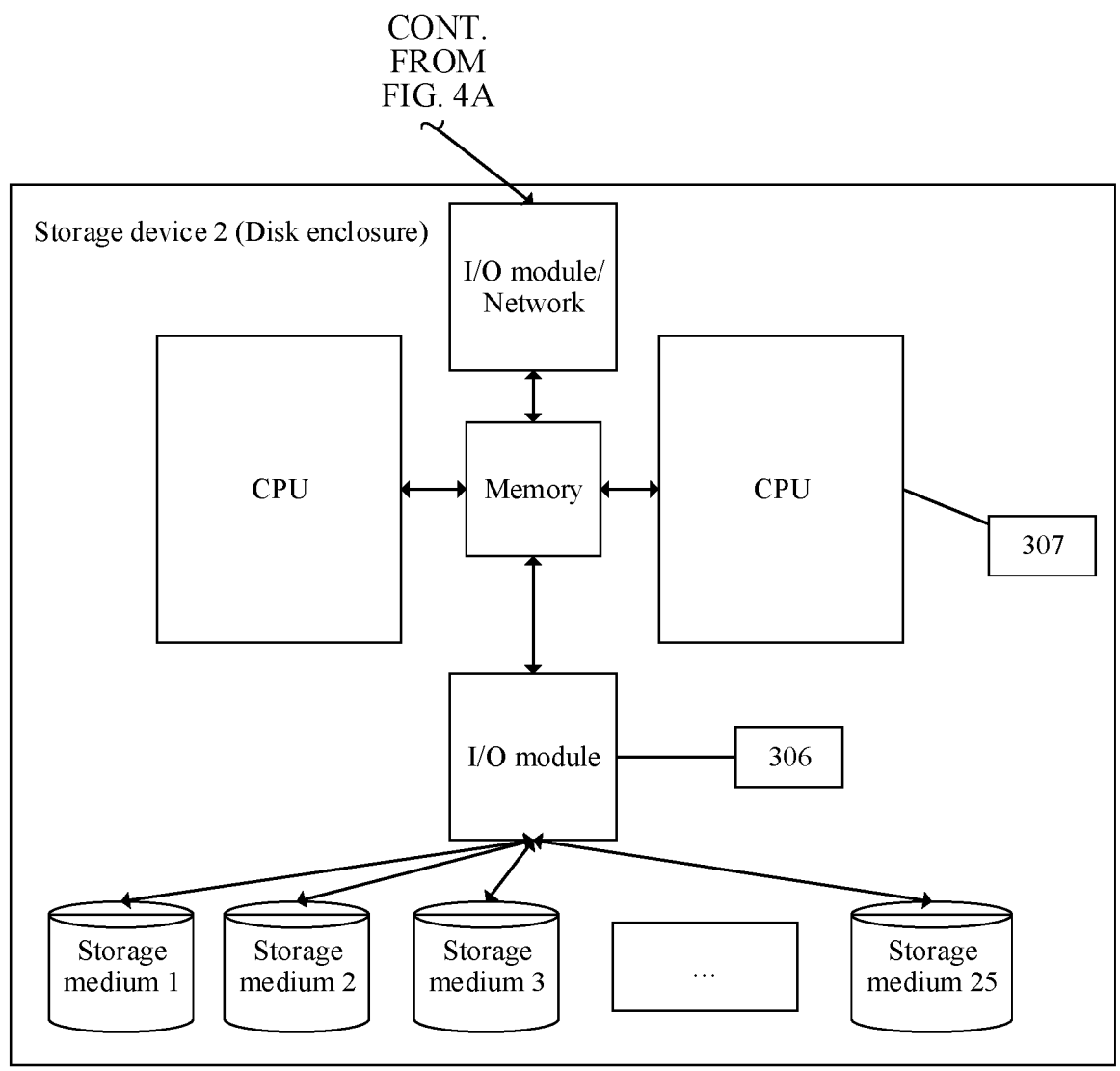

When the target quantity is greater than 1, to further describe a process in operation 303, refer to a schematic diagram of a block reconstruction process according to an embodiment of the present disclosure shown in FIG. 4A, FIG. 4B, and FIG. 4C. In FIG. 4A, FIG. 4B, and FIG. 4C, there are one control device and two disk enclosures. Each disk enclosure is one storage device. In other words, the target quantity is 2. Both the control device and the disk enclosure include a CPU, a memory, and an I/O unit. The disk enclosure further includes a storage medium used to store data. The I/O unit in the disk enclosure may be replaced with a network interface unit (the network interface unit is referred to as a network for short in FIG. 4A, FIG. 4B, and FIG. 4C), and a function of the network interface unit is the same as that of the I/O unit. The control device groups the blocks in the first stripe based on the enclosure. Specifically, it is assumed that the storage device (disk enclosure) 1 stores the blocks 1 to 12 in the first stripe, and it is assumed that the storage device (disk enclosure) 2 stores the blocks 13 to 25 in the first stripe. The control device may use the block 1 (the first block) and the block 25 (the second block) as to-be-restored blocks, namely, to-be-solved blocks. Therefore, the blocks 2 to 12 stored on the storage device 1 are the third blocks, in the first stripe, stored on the storage device 1. The blocks 13 to 24 stored on the storage device 2 are the third blocks, in the first stripe, stored on the storage device 2. Further, the control device may split and obtain the second to the twelfth columns, of the check matrix, corresponding to the blocks 2 to 12, to form a second submatrix $H_1$ corresponding to the storage device 1. The control device may split and obtain the thirteenth to the twenty-fourth columns, of the check matrix, corresponding to the blocks 13 to 24, to form a second submatrix $H_2$ corresponding to the storage device 2. The control device may split and obtain the first column and the twenty-fifth column, of the check matrix H, corresponding to the block 1 and the block 25, to form a first submatrix $H_3$. $H_1$ to $H_3$ may be represented as:

$$H_1 = \begin{pmatrix} a_{1,2} & a_{1,3} & \cdots & a_{1,12} \\ a_{2,2} & a_{2,3} & \cdots & a_{2,12} \end{pmatrix}$$

$$H_2 = \begin{pmatrix} a_{1,13} & a_{1,14} & \cdots & a_{1,23} \\ a_{2,13} & a_{2,14} & \cdots & a_{2,23} \end{pmatrix}$$

$$H_3 = \begin{pmatrix} a_{1,1} & a_{1,25} \\ a_{2,1} & a_{2,25} \end{pmatrix}$$

Figure 5:
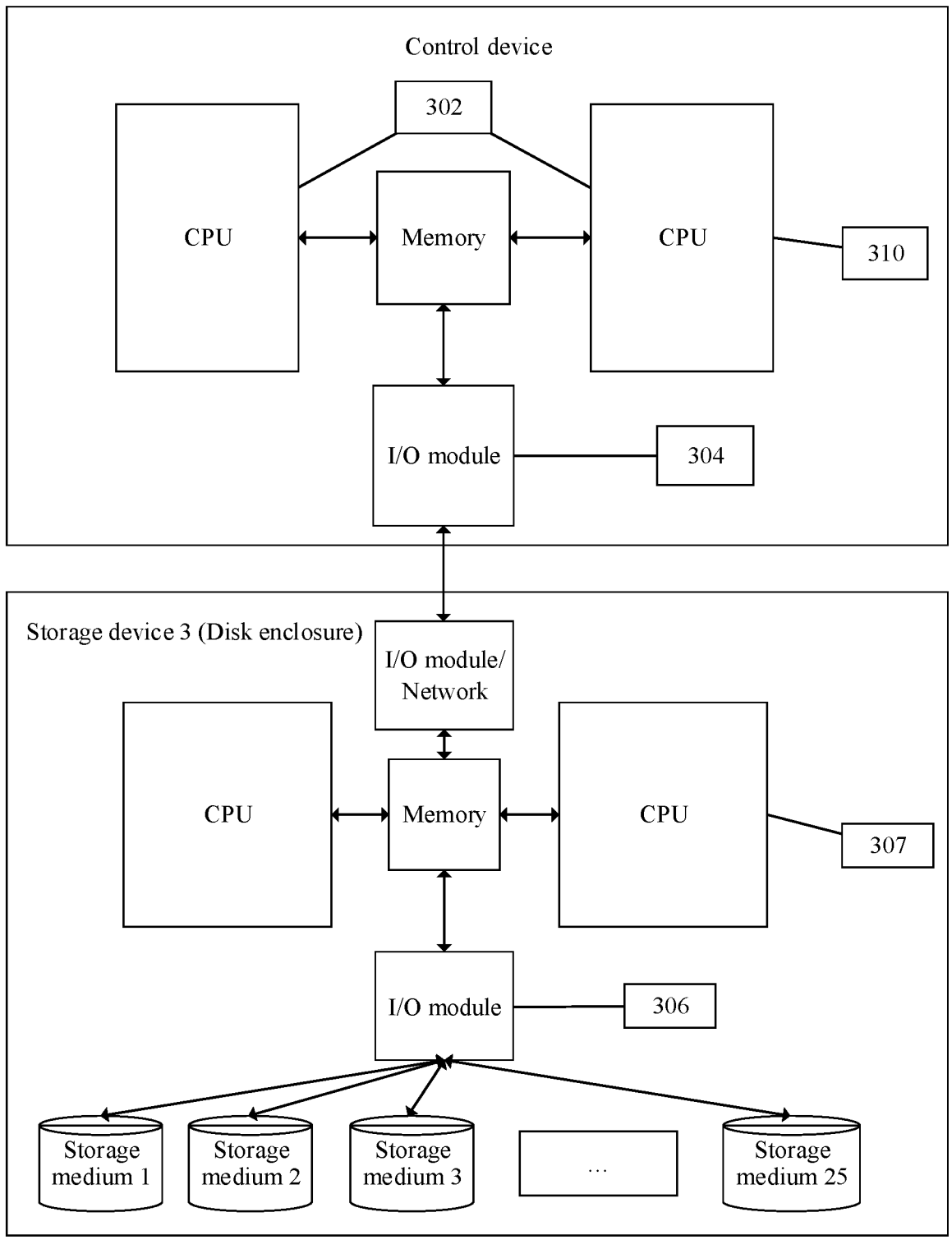
FIG. 5 is a schematic diagram of a block reconstruction process according to an embodiment of the present disclosure.

When the target quantity is 1, to further describe the process in operation 303, refer to a schematic diagram of a block reconstruction process according to an embodiment of the present disclosure shown in FIG. 5. In FIG. 5, there are one control device and one disk enclosure. In other words, the target quantity is 1. Both the control device and the disk enclosure include a CPU, a memory, and an I/O unit. The disk enclosure further includes a storage medium used to store data. The I/O unit in the disk enclosure may be replaced with a network interface unit (the network interface unit is referred to as a network for short in FIG. 4A, FIG. 4B, and FIG. 4C), and a function of the network interface unit is the same as that of the I/O unit. The storage device (disk enclosure) 3 stores the blocks 1 to 25 in the first stripe. The control device may use the block 1 (the first block) and the block 25 (the second block) as to-be-restored blocks, namely, to-be-solved blocks. Therefore, the blocks 2 to 24 stored on the storage device 3 are the third blocks, in the first stripe, stored on the storage device 3. Further, the control device may split and obtain the second to the twenty-fourth columns, of the check matrix, corresponding to the blocks 2 to 24, to form a second submatrix $H_4$ corresponding to the storage device 3. The control device may split and obtain the first column and the twenty-fifth column, of the check matrix H, corresponding to the block 1 and the block 25, to form the first submatrix $H_3$. H4 may be represented as:

$$H_4 = \begin{pmatrix} a_{1,2} & a_{1,3} & \cdots & a_{1,24} \\ a_{2,2} & a_{2,3} & \cdots & a_{2,24} \end{pmatrix}$$

304: The control device sends a first obtaining request to a storage device corresponding to each second submatrix, where the first obtaining request carries a second submatrix corresponding to a storage device, block information of a third block corresponding to each column of the second submatrix, and an identifier of the control device.

Each first obtaining request is used to indicate to send a first result to the control device. The first obtaining request is one type of obtaining request. The obtaining request carries the second submatrix corresponding to the storage device, the block information of the third block corresponding to each column of the second submatrix, and the identifier of the control device. When an identifier of a target device is the identifier of the control device, the obtaining request is a fourth obtaining request. In this case, the target device is the control device.

To enable each storage device to calculate each sub-process of a process of solving the first submatrix, the control device may send each second submatrix to a storage device corresponding to the second submatrix. Then, the storage device completes the sub-process (a process of solving the first result shown in operations 306 and 307).

Because the storage device may store a plurality of blocks in a plurality of stripes, the control device may send the block information of the third block corresponding to the second submatrix to the storage device, so that the storage device may obtain, based on the block information of the third block, the third block corresponding to the received second submatrix. Therefore, the control device may form the first obtaining request by using one second submatrix and block information of a third block corresponding to the submatrix, and send the first obtaining request to a corresponding storage device.

It should be noted that, in some embodiments, the control device completes reconstructing the first block. In some embodiments, a target storage device completes reconstructing the first block. When completing reconstructing the first block, the control device or the target storage device may obtain a calculation result from the target quantity of storage devices. Therefore, when the identifier, of the target device, carried in the obtaining request is the identifier of the control device, the obtaining request is the first obtaining request and is used to indicate to send the first result to the control device. The first result (namely, a calculation result from the storage device) is obtained after the storage device reads the stored valid block in the first stripe and performs calculation based on the read valid block.

For example, the control device in FIG. 4A sends a first obtaining request 1 to the storage device 1 through the I/O unit, and the first obtaining request 1 carries the second submatrix $H_1$ and block information of the blocks 2 to 12. The control device sends a first obtaining request 2 to the storage device 2 through the I/O unit, and the first obtaining request 2 carries the second submatrix $H_2$ and block information of the blocks 13 to 24. For another example, the control device in FIG. 5 sends a first obtaining request 3 to the storage device 3 through the I/O unit, and the first obtaining request 3 carries the second submatrix $H_1$ and the block information of the blocks 2 to 24.

305: The storage device receives the first obtaining request.

The storage device is any one of the target quantity of storage devices. Each of the target quantity of storage devices receives one first obtaining request in operation 305. For example, the storage devices 1 and 2 in FIG. 4B and FIG. 4C respectively receive the first obtaining requests 1 and 2 through respective I/O unit. For another example, the storage device 3 in FIG. 5 receives the first obtaining request 3 through the I/O unit. Operation 305 is an operation in which the storage device receives the obtaining request.

306: The storage device reads the at least one third block based on the block information of the third block corresponding to each column of the second submatrix.

The storage device may determine, based on the block information of the third block corresponding to each column of the second submatrix, a storage location of the third block corresponding to each column of the second submatrix. Then, the storage device reads the at least one third block at the storage location of the third block corresponding to each column of the second submatrix. For example, the storage device 1 in FIG. 4B may read the blocks 2 to 12 through the I/O unit based on the block information, of the blocks 2 to 12, in the first obtaining request 1. The storage device 2 in FIG. 4C may read the blocks 13 to 24 through the I/O unit based on the block information, of the blocks 13 to 24, in the first obtaining request 2. For another example, the storage device 3 in FIG. 5 may read the blocks 2 to 24 through the I/O unit based on the block information, of the blocks 2 to 24, in the first obtaining request 3.

The third block is the read valid block. It should be noted that a process shown in operation 306 is a process of reading the at least one third block based on the block information of the third block corresponding to each column of the second submatrix.

307: The storage device performs calculation based on the at least one third block and the second submatrix to obtain a first result.

The first result may be used to represent a feature of the third block corresponding to each column of the second submatrix. The storage device may form a block matrix by using the at least one third block, and each row of the block matrix is one third block. The storage device multiplies the second submatrix by the block matrix, to obtain the first result. A process shown in operation 307 is a process of obtaining the first result through calculation based on the read valid block.

For example, the CPU of the storage device 1 in FIG. 4B forms a block matrix $P_1$ by using the blocks 2 to 12, and multiplies $H_1$ by $P_1$ to obtain a first result $Q_1$. The CPU of the storage device 2 forms a block matrix $P_2$ by using the block 13 and the block 14, and multiplies $H_2$ by $P_2$ to obtain a first result $Q_2$, where $P_1=(x_1, x_2, \ldots, x_{12})^T$, $Q_1=H_1*P_1$, $P_2=(x_{13}, x_{14}, \ldots, x_{23})^T$, and $Q_2=H_2*P_2$.

For another example, the CPU of the storage device 3 in FIG. 5 forms a block matrix $P_3$ by using the blocks 2 to 24, and multiplies $H_4$ by $P_3$ to obtain a first result $Q_3$, where $P_3=(x_1, x_2, \ldots, x_{24})^T$ and $Q_3=H_4*P_3$.

308: The storage device sends the first result to the control device.

Because the first request carries the identifier of the control device, the storage device sends the first result to the control device. It should be noted that because the storage device is any one of the target quantity of storage devices, all the target quantity of storage devices may perform processes shown in the operations 305 to 308.

309: The control device obtains the first result returned by the target quantity of storage devices based on the first obtaining request.

Because all the target quantity of storage devices perform operation 308, the control device may receive the target quantity of first results. Therefore, the control device may obtain the target quantity of first results. Each first result is obtained after one of the target quantity of storage devices reads the stored valid block in the first stripe and performs calculation based on the read valid block.

For example, the control device in FIG. 4A may obtain the first result $Q_1$ sent by the storage device 1 and the first result $Q_2$ sent by the storage device 2. For another example, the control device in FIG. 5 may obtain the first result $Q_3$ sent by the storage device 3.

310: The control device reconstructs the first block based on the first result from the target quantity of storage devices and the first submatrix.

One column of the first submatrix corresponds to the first block, and another column corresponds to the second block. Therefore, the control device reconstructs the first block based on the first result from the target quantity of storage devices and the first submatrix, and the control device may also reconstruct the second block based on the first result from the target quantity of storage devices and the first submatrix.

In an embodiment, the control device may sum first results from the target quantity of storage devices, to obtain a summation matrix. The control device obtains a target block matrix based on an inverse matrix of the first submatrix and the summation matrix. The control device determines a first target row of the target block matrix as a reconstructed first block, and determines a second target row of the target block matrix as a reconstructed second block. A first target column of a transposed matrix of the target block matrix is the first target row of the target block matrix, and a second target column is the second target row of the target block matrix. The first target column corresponds to the first block, and the second target column corresponds to the second block. The obtaining the target block matrix based on the inverse matrix of the first submatrix and the summation matrix may be: multiplying the inverse matrix of the first submatrix by the summation matrix and taking a negative value, to obtain the target block matrix. It should be noted that a process shown in operation 310 is a process of reconstructing the first block based on the first result from the target quantity of storage devices.

For example, $H*x^T=H_1*(x_2, x_3, \ldots, x_{12})^T+H_2*(x_{13}, x_{14}, \ldots, x_{23})^T+H_3*(x_1,x_{25})^T=0$ is $H_1*P_1+H_2*P_2+H_3*(x_1,x_{25})^T=0$, $Q_1+Q_2+H_3*(x_1,x_{25})^T=0$, or $(x_1,x_{25})^T=-H_3^{-1}*(Q_1+Q_2)$. Therefore, the control device in FIG. 4A may perform a calculation process shown by $(x_1,x_{25})^T=-H_3^{-1}*(Q_1+Q_2)$, to obtain the target block matrix $(x_1,x_{25})^T$, where $(x_1,x_{25})$ is the transposed matrix of the target block matrix, $x_1$ obtained by the control device through calculation is the reconstructed first block, and $x_{25}$ is the reconstructed second block.

It should be noted that when the target quantity is 1, the control device does not need to calculate the summation matrix, but directly obtains the target block matrix based on the inverse matrix of the first submatrix and the first result.

For example, $H*x^T=H_4*(x_2, x_3, \ldots, x_{24})^T+H_3*(x_1, x_{25})^T=0$ is $Q_3+H_3*(x_1,x_{25})^T=0$. Therefore, the control device in FIG. 5 may perform a calculation process shown by $(x_1,x_{25})^T=-H_3^{-1}*Q_3$, to obtain $x_1$ and $x_{25}$.

311: The control device sends a write request to the target storage device, where the write request carries the reconstructed first block and block information of the reconstructed first block.

It should be noted that, in some embodiments, in some stripes, there may be a silence error that a calculation process is correct, but a final calculation result is incorrect. If there is the silence error in the first stripe, content of the reconstructed first block may be different from content of the first block. Because the first block is lost, the control device cannot determine whether the content of the reconstructed first block is the same as the original content of the first block. In this case, the control device may determine, based on whether content of the second block is the same as content of the reconstructed second block, whether there is the silence error in the first stripe.

In some embodiments, before operation 311, the control device obtains the second block from a storage device that stores the second block. If the reconstructed second block is the same as the obtained second block, the control device performs the operation of sending a write request to a target storage device; otherwise, skips performing the operation of sending a write request to a target storage device, and prevents use of the first stripe.

A process in which the control device obtains the second block from the storage device that stores the second block may be as follows: The control device sends a read request to the storage device that stores the second block, and the read request carries block information of the second block. After receiving the read request, the storage device that stores the second block sends the second block to the control device based on the block information of the second block, so that the control device may receive the second block.

Figure 6A:
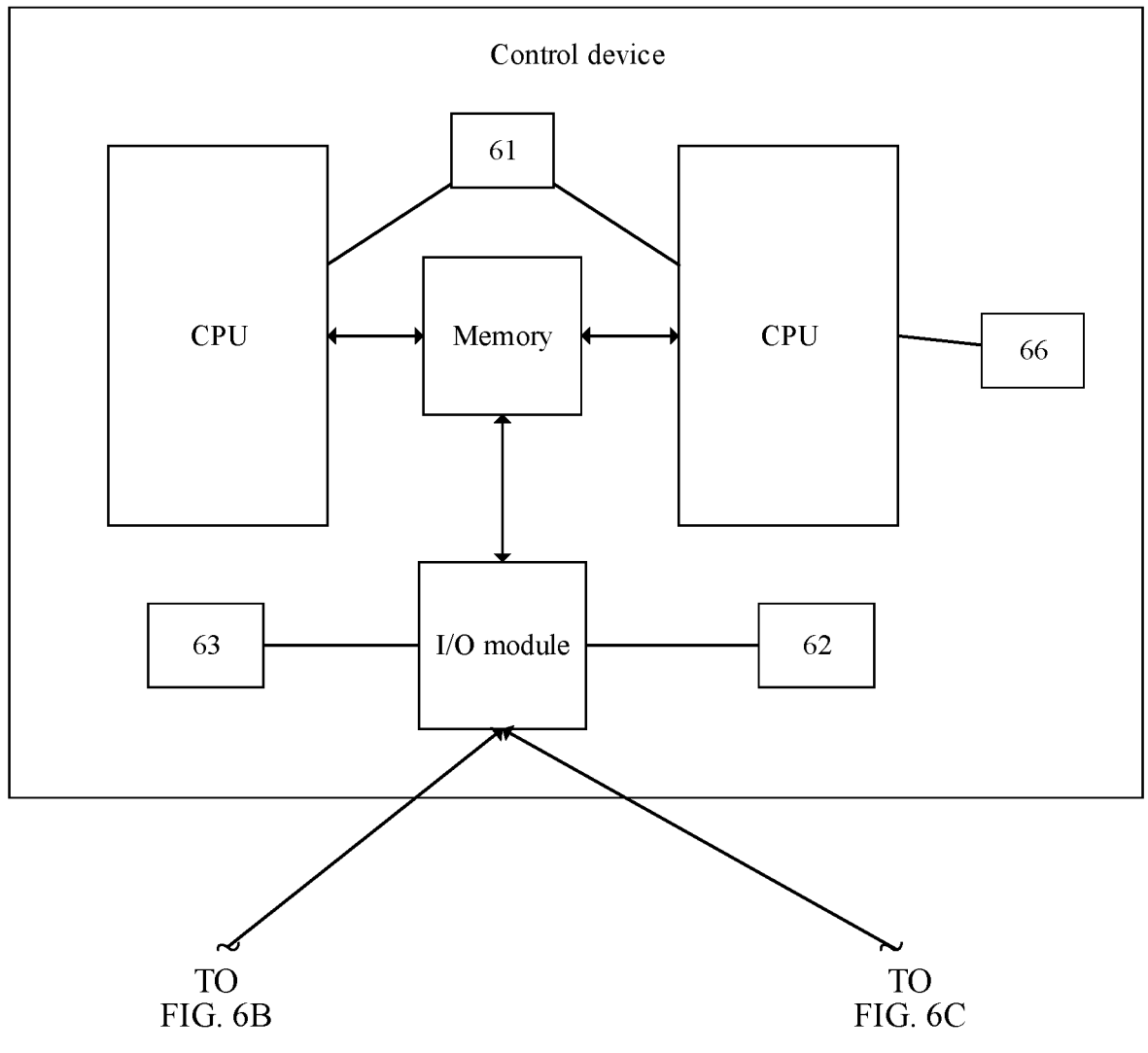
FIG. 6A, FIG. 6B, and FIG. 6C are a schematic diagram of a block reconstruction process according to an embodiment of the present disclosure.
Figure 6B:
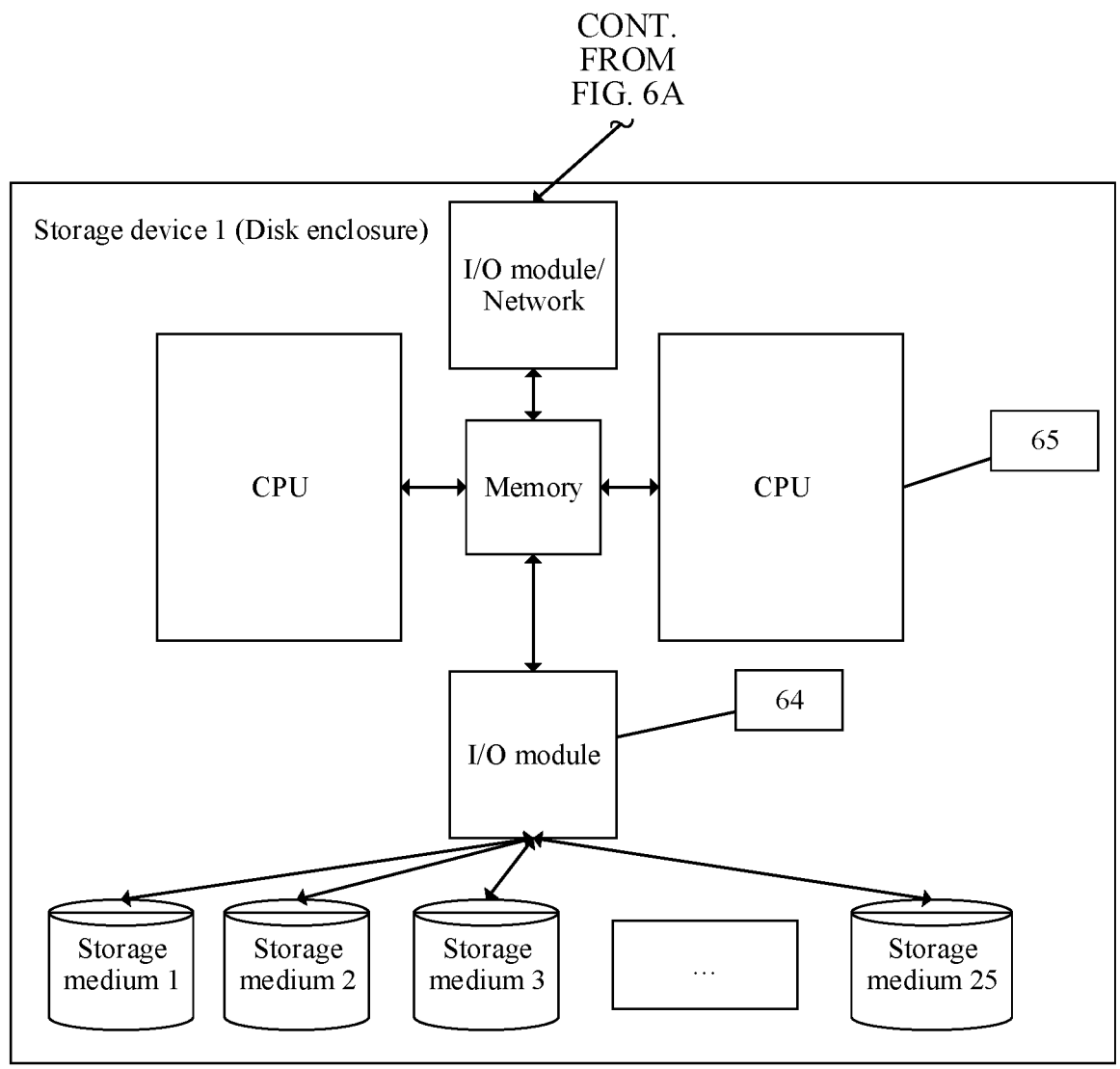
Figure 6C:
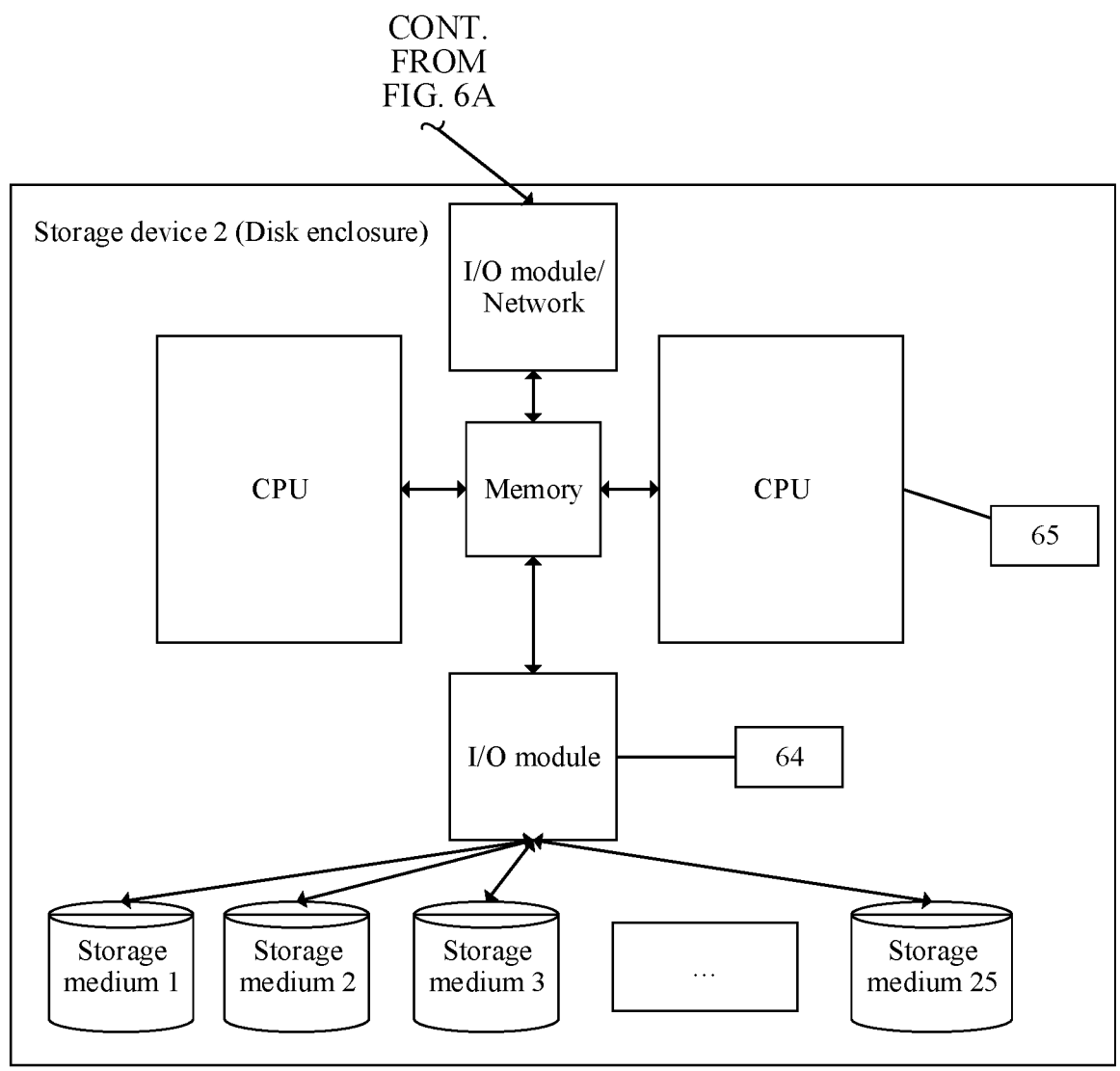

For example, FIG. 6A, FIG. 6B, and FIG. 6C are a schematic diagram of a block reconstruction process according to an embodiment of the present disclosure. The block reconstruction process shown in FIG. 6A, FIG. 6B, and FIG. 6C may include the following operations 61 to 66.

Operation 61: A control device initiates reconstruction, and finds a faulty block (a block 1) through scanning.

A process shown in operation 61 is a process shown in operation 302.

Operation 62: The control device groups, based on an enclosure, blocks in a stripe in which the block 1 is located. It is assumed that blocks 1 to 12 are on a storage device 1, blocks 13 to 25 are on a storage device 2, and the block 1 and the block 25 may be restored. In this case, the control device splits a check matrix H into three submatrices ($H_1$, $H_2$, and $H_3$), and sends a first obtaining request to a storage device through an I/O unit.

The matrices $H_1$ and $H_2$ are second submatrices, and the submatrix $H_3$ is a first submatrix. The control device divides the blocks 2 to 24 into two groups: The blocks 2 to 12 are one group, and the storage device 1 performs calculation on the submatrix $H_1$. The blocks 13 to 24 are one group, and the storage device 2 performs calculation on the submatrix Hz. Operation 62 may be performed by the I/O unit of the control device.

Operation 63: The control device separately reads the block 25.

In other words, the control device reads the block 25 from the storage device 2 that stores the block 25. Operation 63 may be performed by the I/O unit of the control device.

Operation 64: After receiving the request, the storage device reads a block in a storage medium through an I/O unit.

Operation 64 may be performed by the I/O unit of the storage device.

Operation 65: After reading the block, the storage device performs calculation to obtain an intermediate result Q (a first result).

On the storage device 1, calculation is performed on the submatrix $H_1$ and a third block corresponding to the submatrix $H_1$, to obtain an intermediate result $Q_1$. On the storage device 2, calculation is performed on the submatrix $H_2$ and a third block corresponding to the submatrix $H_2$, to obtain an intermediate result $Q_2$. Finally, the storage device 1 and the storage device 2 return the intermediate results ($Q_1$ and $Q_2$) to the control device. Q includes the intermediate results $Q_1$ and $Q_2$. Operation 65 may be performed by a CPU of the storage device.

Operation 66: The control device uses the intermediate result Q and the submatrix $H_3$ to calculate a final result, and restores the block 1 and the block 25. In addition, the control device compares a restored block 25 with the block 25 read in operation 63. If data of the two blocks is the same, the control device writes the block 1 into a storage medium on a target storage device. If the data of the two blocks is different, it indicates that there is a silence error in the stripe, and then the stripe is isolated for protection.

Operation 65 may be performed by a CPU of the control device. It should be noted that structures of the storage device and the control device in FIG. 6A, FIG. 6B, and FIG. 6C are similar to structures of the storage device and the control device in FIG. 4A, FIG. 4B, and FIG. 4C.

312: The target storage device stores the reconstructed first block based on the block information of the reconstructed first block.

The target storage device may determine a storage location, of the reconstructed first block, in the target storage device based on the block information of the reconstructed first block, so that the target device may store the received reconstructed first block at the determined storage location.

It should be noted that, after the target storage device completes storing the reconstructed first block, the target storage device sends a storage success response to the control device. The storage success response is used to indicate that the reconstructed first block is completely stored. After receiving the storage success response, the control device queries whether all lost blocks in the first stripe are completely reconstructed. If not all the blocks are reconstructed, the control device continues to perform the foregoing block reconstruction process on any block that is not reconstructed; otherwise, the first stripe is completely reconstructed.

After the control device completes reconstruction of the first block, the control device may further query whether another block in the first stripe is lost. If another block in the first stripe is lost, the control device performs processes shown in operations 302 to 312 on any one of lost blocks found through query. If another block in the first stripe is not lost, it may be considered that the first stripe is completely reconstructed.

Because there may be a plurality of stripes in which a block is lost, after the first stripe is reconstructed, the control device may further query whether there is another stripe in which a block is lost. If there is a stripe in which a block is lost, the control device reconstructs each lost block in the another stripe. In other words, processes shown in operations 302 to 312 are performed.

Figure 7:
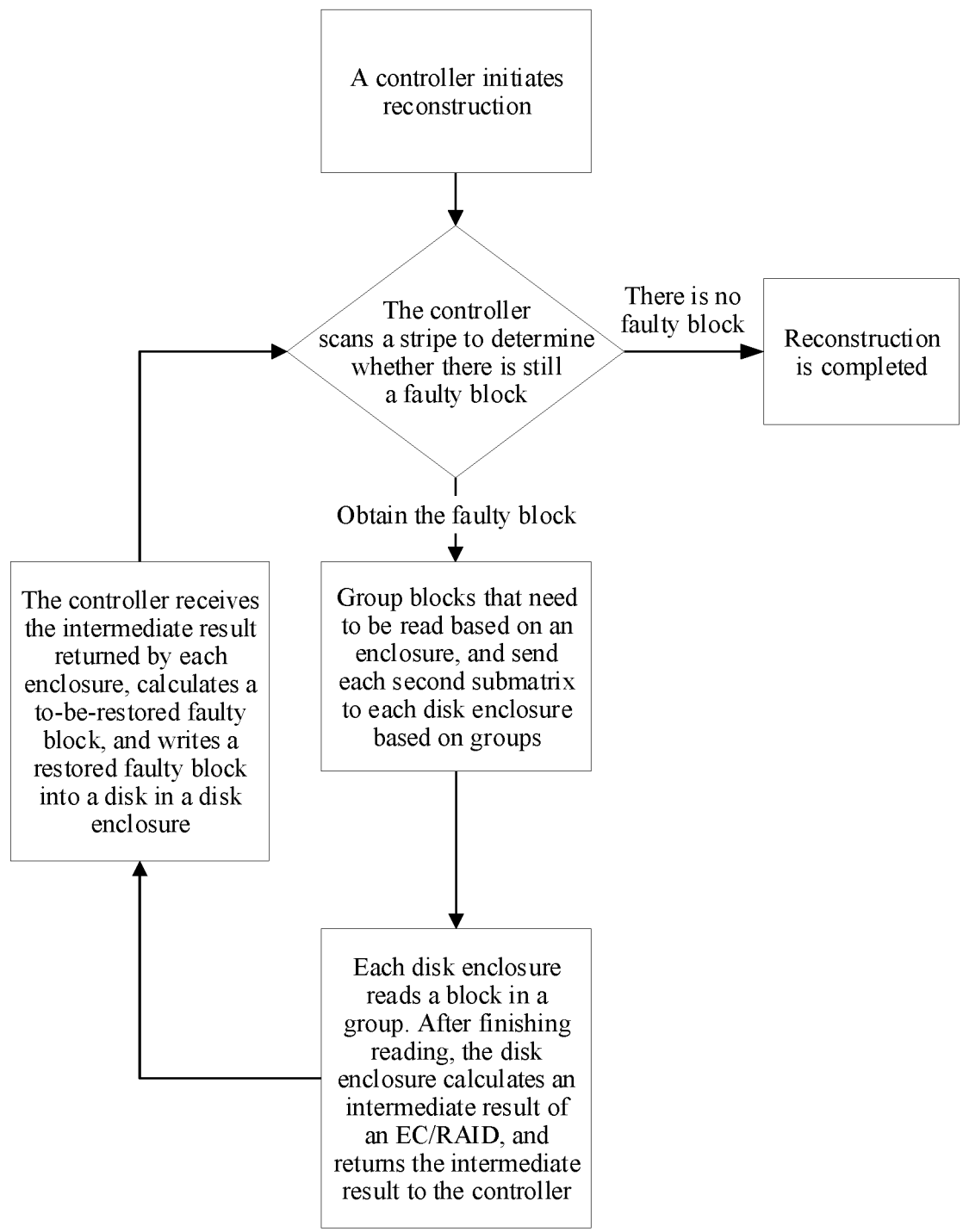
FIG. 7 is a flowchart of a data reconstruction method according to an embodiment of the present disclosure.

To further describe processes shown in operations 301 to 312, refer to a flowchart of a data reconstruction method according to an embodiment of the present disclosure shown in FIG. 7. In FIG. 7, after a controller (a control device) initiates reconstruction, the controller scans a stripe to determine whether there is a faulty block. If there is no faulty block, the reconstruction is completed. If there is a faulty block, the controller obtains the faulty block (a lost block), groups, based on an enclosure, blocks that are to be read, and splits a check matrix of the obtained stripe based on groups. Then, the controller sends a second submatrix obtained through splitting to a corresponding disk enclosure. In other words, the controller sends each second submatrix to each disk enclosure based on the groups. Each disk enclosure reads a block in a corresponding group. After completing reading, the disk enclosure calculates an intermediate result of an EC/RAID, and returns the intermediate result to the controller. The controller receives the intermediate result returned by each disk enclosure, calculates a restored faulty block, and writes the restored faulty block into a disk in a disk enclosure. After completing writing, the controller continues to scan the stripe, to determine whether there is still a faulty block in the stripe.

It should be noted that, after the control device receives the storage success response, the control device updates information of the first block in the association table. Specifically, block information of the first block is updated to the block information of the reconstructed first block, a node identifier of the first block is updated to a node identifier of the target storage device, and the like. In this way, the control device may subsequently read the reconstructed first block from the target storage device.

According to the method provided in this embodiment of the present disclosure, the control device directly reconstructs the lost first block in the first stripe based on the obtained first result from the target quantity of storage devices, so that the control device does not need to read an unlost block in the first stripe from the storage device. The control device may obtain the target quantity of first results from the storage device, to reconstruct the first block. An amount of data of the first result is less than that of the unlost block in the first stripe. Therefore, in the process of reconstructing the first block, there is a relatively small amount of data transmitted between the control device and the storage device. A data transmission process occupies less network bandwidth and this improves block reconstruction performance. In addition, the first result sent by each storage device may be obtained provided that one first obtaining request is sent to each storage device, and there is no need to send a large quantity of read requests to each storage device. This reduces CPU overheads of the control device and further reduces occupied network bandwidth, to improve the block reconstruction performance. In addition, comparing whether the content of the second block is the same as the content of the reconstructed second block can avoid data silence. This improves system reliability. Because there is a relatively small amount of data in a transmission process, a data transmission speed is fast, and a transmission time period is short. Because the CPU overheads are reduced, more CPUs may be used for calculation in a calculation process, to shorten a calculation time period. In addition, the first results are separately completed on different devices, to further shorten the calculation time period. Therefore, a time period for reconstructing the block is relatively short. This improves the system reliability.

In the embodiment shown in FIG. 3A and FIG. 3B, the control device may reconstruct the first block based on the first result and the first submatrix. In some embodiments, the target storage device may also reconstruct the first block based on the first result and the first submatrix.

Figure 8A:
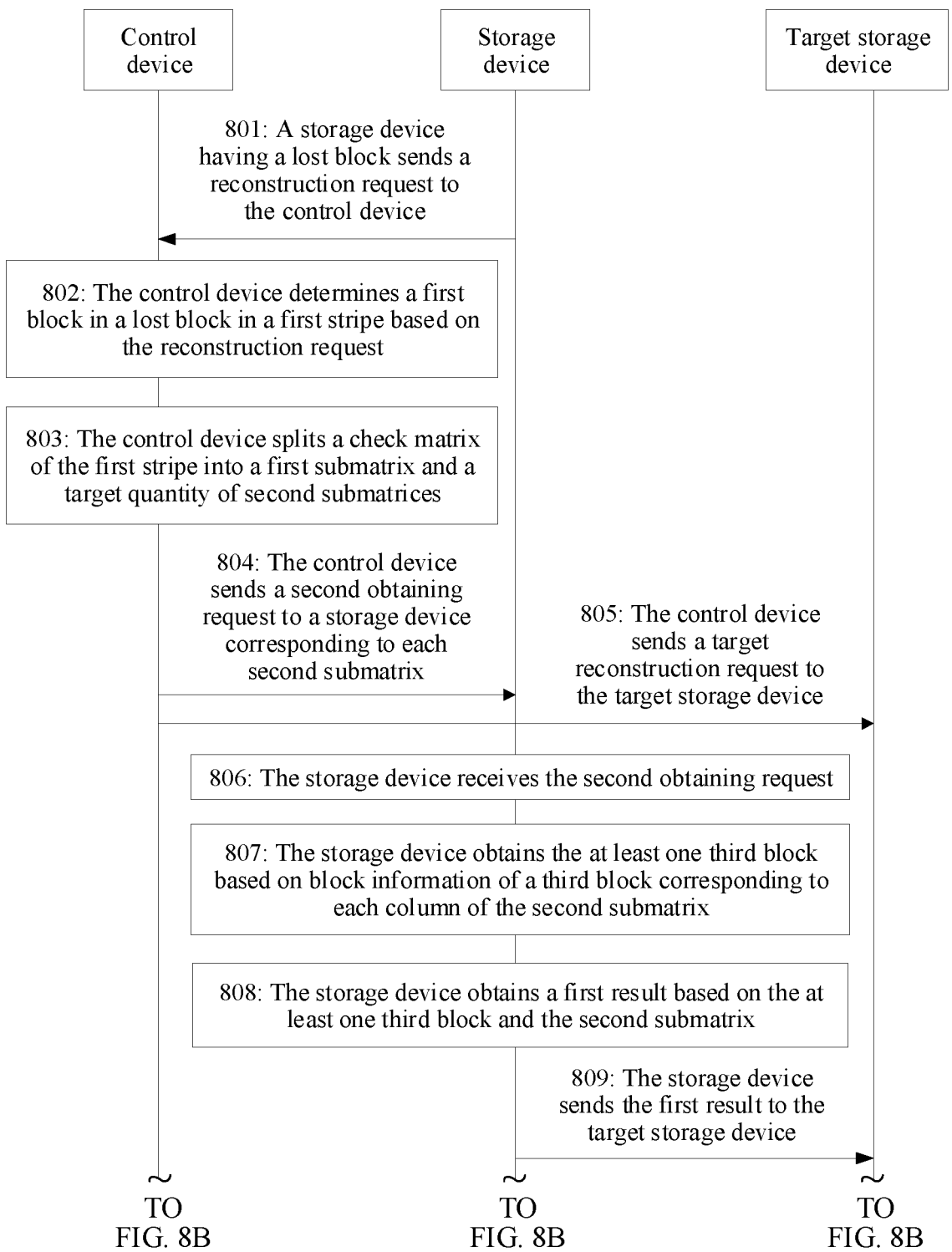
FIG. 8A and FIG. 8B are a flowchart of a data reconstruction method according to an embodiment of the present disclosure.
Figure 8B:
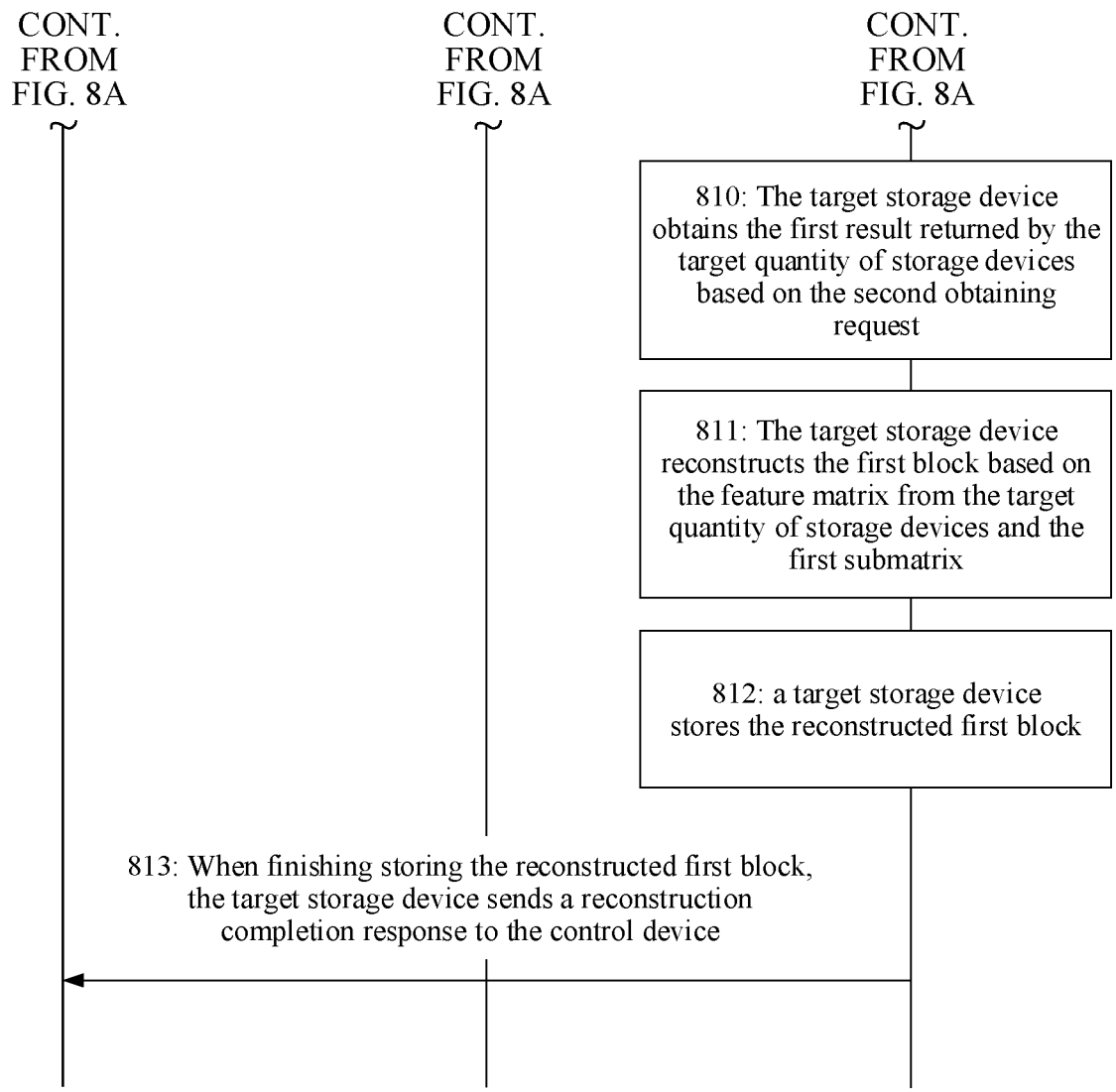

To further present a process in which the target storage device reconstructs the first block based on the first result and the first submatrix, refer to a flowchart of a data reconstruction method according to an embodiment of the present disclosure shown in FIG. 8A and FIG. 8B. The method may include the following operations.

801: A storage device having a lost block sends a reconstruction request to a control device.

A process shown in operation 801 is similar to that shown in operation 301. Herein, operation 801 is not described in detail in this embodiment of the present disclosure.

802: The control device determines a lost first block in a first stripe based on the reconstruction request, where a block in the first stripe is stored by a target quantity of storage devices.

A process shown in operation 802 is similar to that shown in operation 302. Herein, operation 802 is not described in detail in this embodiment of the present disclosure.

803: The control device splits a check matrix of the first stripe into a first submatrix and the target quantity of second submatrices, where the first submatrix includes a column, of the check matrix, corresponding to the first block and a column, of the check matrix, corresponding to a second block, each second submatrix includes a column corresponding to at least one third block, stored on one storage device, in the first stripe, the second block is any block in a valid block in the first stripe, and the third block is any block other than the second block in the valid block.

A process shown in operation 803 is similar to that shown in operation 303. Herein, operation 803 is not described in detail in this embodiment of the present disclosure.

804: The control device sends a second obtaining request to a storage device corresponding to each second submatrix, where each second obtaining request carries the second submatrix corresponding to a storage device, block information of a third block corresponding to each column of the second submatrix, and an identifier of a target storage device, and each second obtaining request is used to indicate to send a first result to the target storage device.

The second obtaining request is one type of obtaining request. The obtaining request carries the second submatrix corresponding to the storage device, the block information of the third block corresponding to each column of the second submatrix, and an identifier of a target device. When the identifier of the target device is the identifier of the target storage device, the obtaining request is the second obtaining request. In this case, the target device is the target storage device.

It should be noted that, when the identifier, of the target device, carried in the obtaining request is an identifier of the control device, the obtaining request is also the second obtaining request. The second obtaining request may further carry an IP address of the target storage device, so that each storage device may send the first result to the target storage device based on the IP address of the target storage device.

805: The control device sends a target reconstruction request to the target storage device, where the target reconstruction request carries the first submatrix, and the target reconstruction request is used to indicate to reconstruct the first block based on the first submatrix.

The target reconstruction request may further carry block information of a reconstructed first block, so that the target storage device may store the reconstructed first block based on the block information of the reconstructed first block. It should be noted that operation 805 may be performed on any occasion before operation 811.

806: The storage device receives the second obtaining request.

It should be noted that a process shown in operation 806 or operation 305 is a process in which the storage device receives the obtaining request. When the obtaining request is a first obtaining request, the obtaining request is used to indicate to send the first result to the control device. When the obtaining request is the second obtaining request, the obtaining request is used to indicate to send the first result to the target storage device.

807: The storage device reads the at least one third block based on the block information of the third block corresponding to each column of the second submatrix.

A process shown in operation 807 is similar to that shown in operation 306. Herein, operation 807 is not described in detail in this embodiment of the present disclosure.

808: The storage device performs calculation based on the at least one third block and the second submatrix to obtain the first result.

A process shown in operation 808 is similar to that shown in operation 307. Herein, operation 808 is not described in detail in this embodiment of the present disclosure.

809: The storage device sends the first result to the target storage device.

The storage device may send the first result to the target storage device based on the IP address, of the target storage device, carried in the second obtaining request. All the target quantity of storage devices may perform processes shown in operations 806 to 809.

810: The target storage device obtains the first result returned by the target quantity of storage devices based on the second obtaining request.

Operation 810 is similar to operation 309 in which the control device obtains the first result returned by the target quantity of storage devices based on the first obtaining request. Herein, operation 810 is not described in detail in this embodiment of the present disclosure.

811: The target storage device reconstructs the first block based on the first result from the target quantity of storage devices and the first submatrix.

A process in which the target storage device reconstructs the first block is similar to a process in which the control device reconstructs the first block in operation 310. Herein, operation 811 is not described in detail in this embodiment of the present disclosure.

812: The target storage device stores a reconstructed first block.

When the second obtaining request carries the block information of the reconstructed first block, the target storage device may store the reconstructed first block based on the block information of the reconstructed first block. If the second obtaining request does not carry the block information of the reconstructed first block, the target storage device may store the reconstructed first block according to a preset storage rule. The preset storage rule is not specifically limited in this embodiment of the present disclosure.

It should be noted that, in some embodiments, before operation 812, the target storage device obtains the second block from a storage device that stores the second block. If the reconstructed block is the same as the obtained second block, the operation of storing the reconstructed first block is performed; otherwise, the operation of storing the reconstructed first block is not performed, and use of the first stripe is prevented. It should be noted that, a process in which the target storage device obtains the second block is similar to a process in which the control device obtains the second block. The process in which the target storage device obtains the second block is not described in detail in this embodiment of the present disclosure.

813: When finishing storing the reconstructed first block, the target storage device sends a reconstruction completion response to the control device, where the reconstruction completion response is used to indicate that the first block is completely reconstructed.

When the target storage device stores the reconstructed first block according to the preset storage rule, the reconstruction completion response may further carry the block information of the reconstructed first block. In this way, after receiving the block information of the reconstructed first block, the control device updates block information of the first block in an association table.

After receiving the reconstruction completion response, the control device queries whether all lost blocks in the first stripe are completely reconstructed. If not all the blocks are reconstructed, the control device continues to perform the foregoing block reconstruction process on any block that is not reconstructed; otherwise, the first stripe is completely reconstructed.

It should be noted that, after the control device receives the reconstruction completion response, the control device updates information of the first block in the association table. Specifically, the block information of the first block is updated to the block information of the reconstructed first block, a node identifier of the first block is updated to a node identifier of the target storage device, and the like. In this way, the control device may subsequently read the reconstructed first block from the target storage device.

Figure 9A:
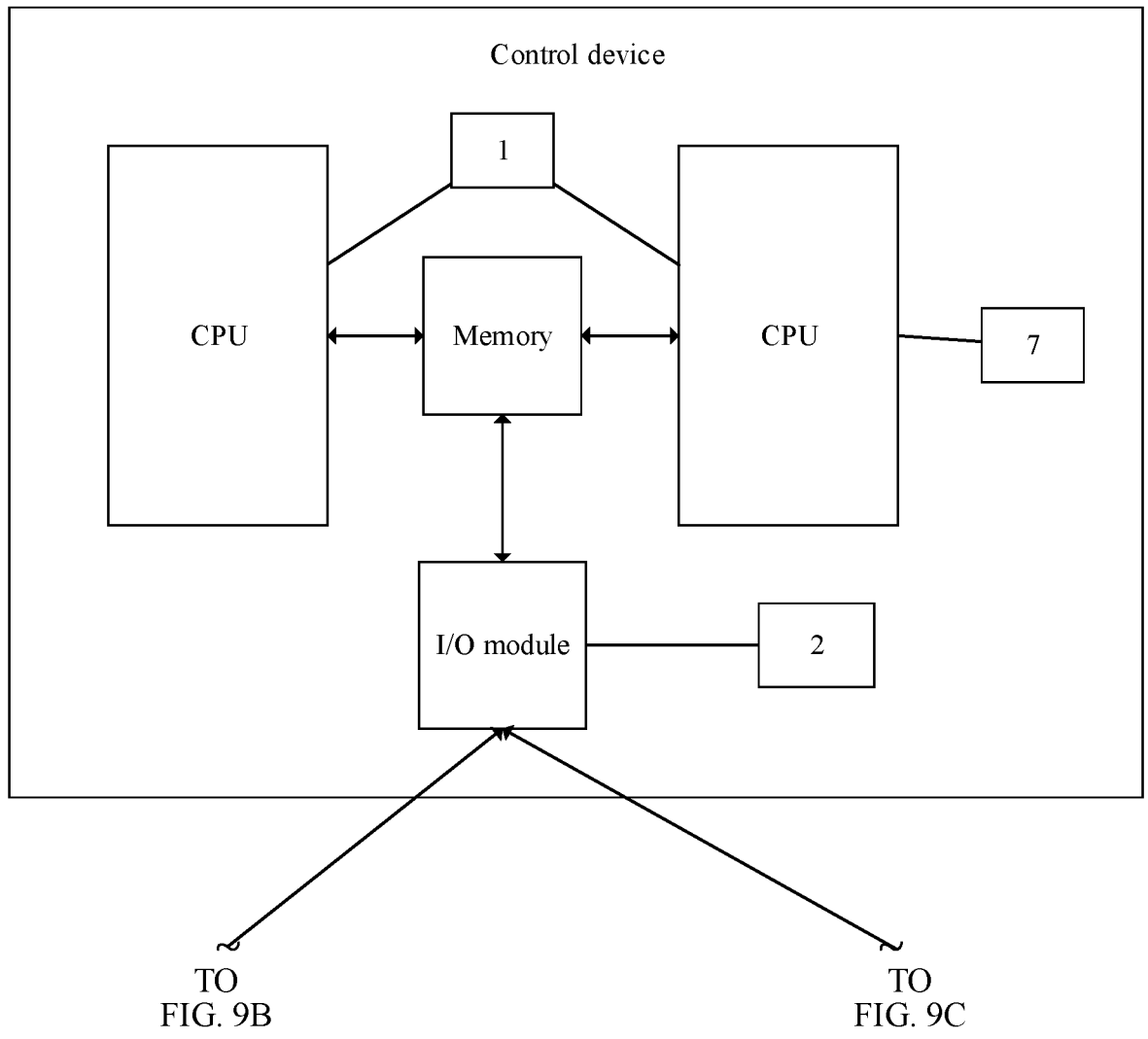
FIG. 9A, FIG. 9B, and FIG. 9C are a schematic diagram of a block reconstruction process according to an embodiment of the present disclosure.
Figure 9B:
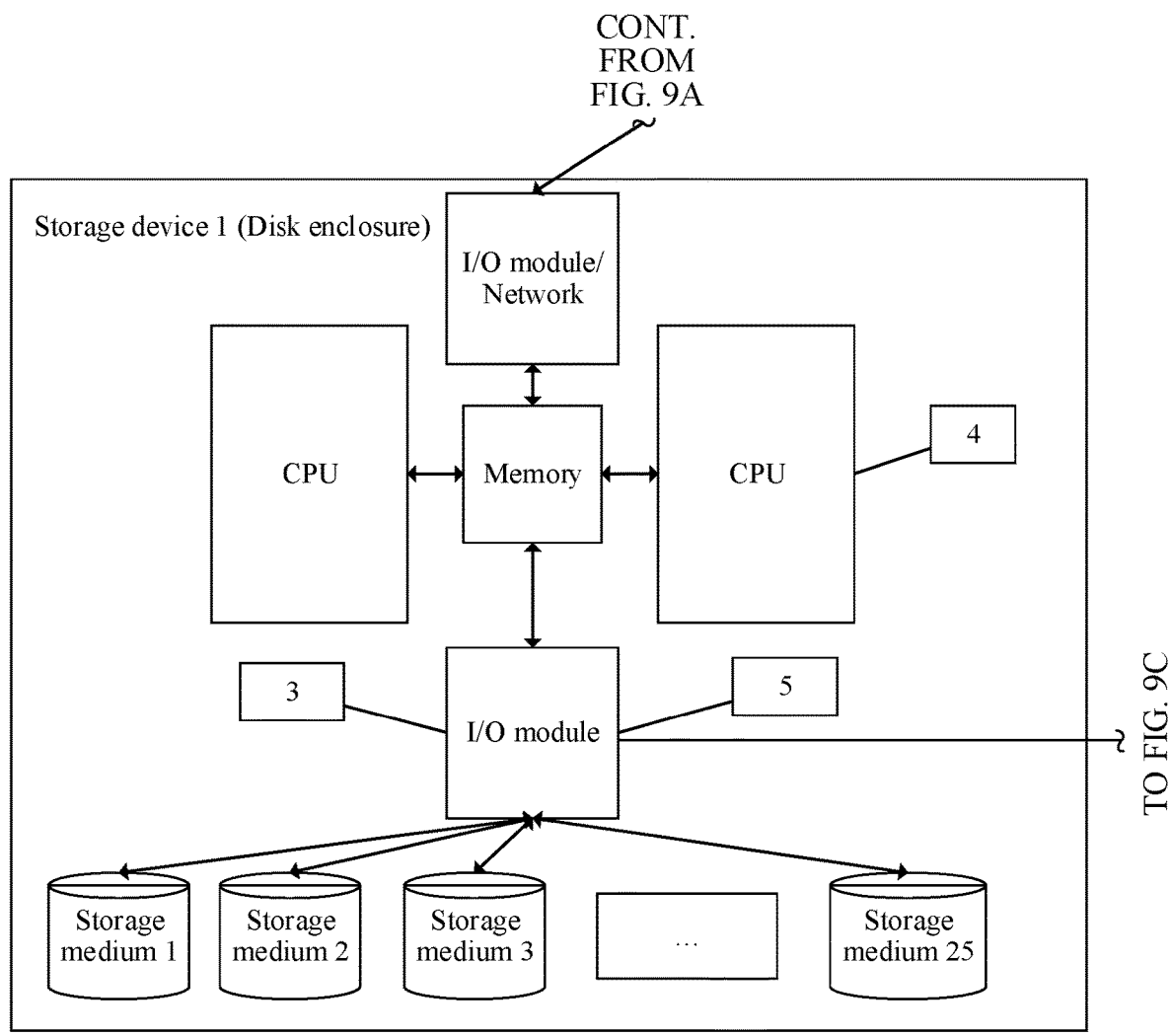
Figure 9C:
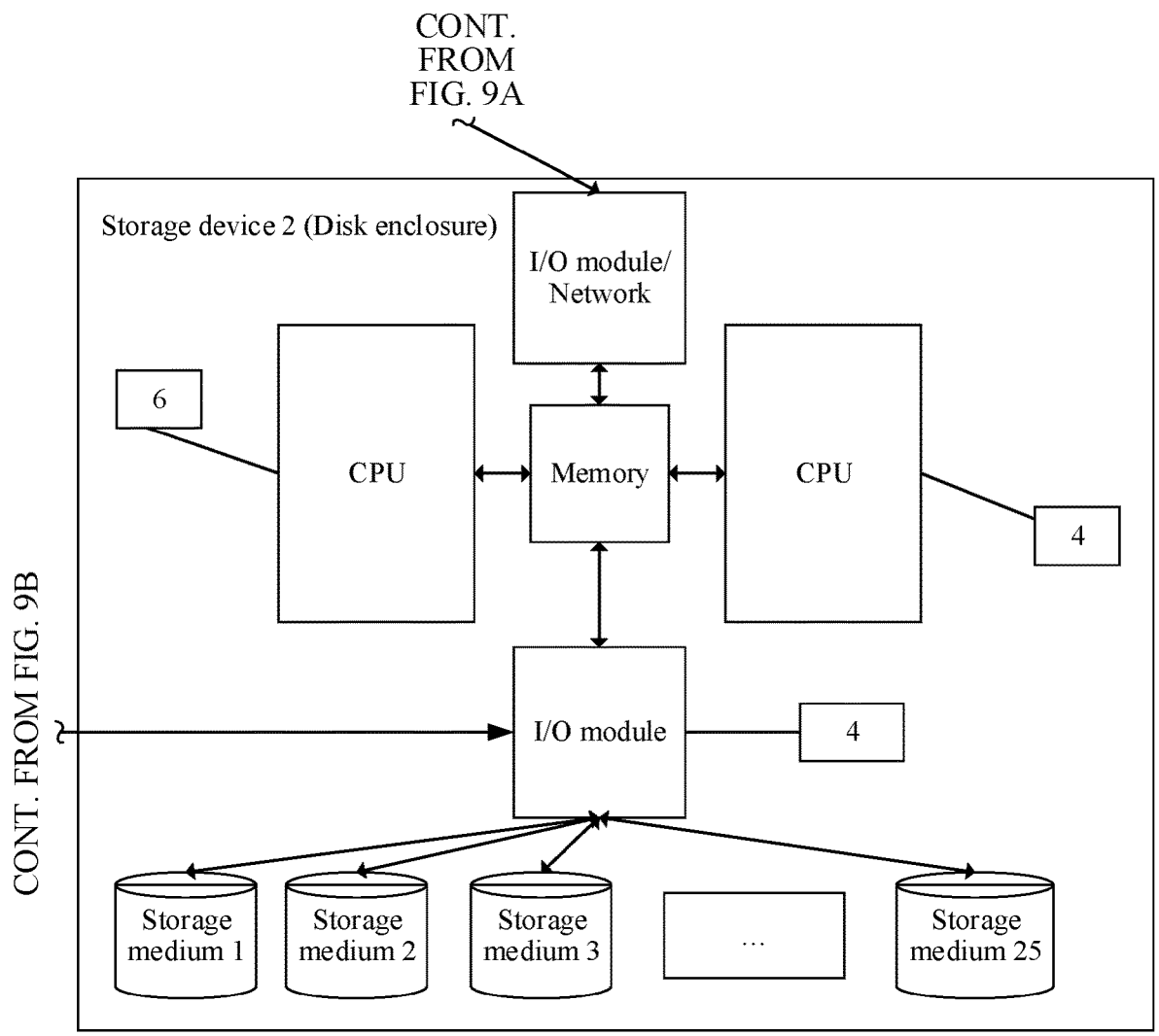

To further describe processes shown in operations 801 to 813, refer to a schematic diagram of a block reconstruction process according to an embodiment of the present disclosure shown in FIG. 9A, FIG. 9B, and FIG. 9C. The block reconstruction process shown in FIG. 9A, FIG. 9B, and FIG. 9C may include the following operations 1 to 7.

Operation 1: A control device initiates reconstruction, and finds a faulty block (a block 1) through scanning.

A process shown in operation 1 is the process shown in operation 802. Operation 1 may be performed by a CPU of the control device.

Operation 2: The control device groups, based on an enclosure, blocks in a stripe in which the block 1 is located. It is assumed that blocks 1 to 12 are on a storage device 1, blocks 13 to 25 are on a storage device 2, and the block 1 and the block 25 may be restored. In this case, the control device splits a check matrix H into three submatrices ($H_1$, $H_2$, and $H_3$), and sends a second obtaining request to a storage device through an I/O unit.

The matrices $H_1$ and $H_2$ are second submatrices, and the submatrix $H_3$ is a first submatrix. The control device divides the blocks 2 to 24 into two groups: The blocks 2 to 12 are one group, and the storage device 1 performs calculation on the submatrix $H_1$. The blocks 13 to 24 are one group, and the storage device 2 performs calculation on the submatrix $H_2$. Operation 62 may be performed by the I/O unit of the control device.

Operation 3: After receiving the request, the storage device reads a block in a storage medium through an I/O unit.

Operation 4: After reading the block through the I/O unit, the storage device uses a CPU to perform calculation, to obtain an intermediate result Q (a first result).

On the storage device 1, calculation is performed on the submatrix $H_1$ and a third block corresponding to the submatrix $H_1$, to obtain an intermediate result $Q_1$. On the storage device 2, calculation is performed on the submatrix $H_2$ and a third block corresponding to the submatrix $H_2$, to obtain an intermediate result $Q_2$.

Operation 5: The storage device 1 sends the intermediate result $Q_1$ to the storage device 2 through an I/O unit.

Operation 6: The storage device 2 uses, through a CPU, the intermediate results $Q_1$ and $Q_2$ and the submatrix $H_3$ to calculate a final result, and restores the block 1 and the block 25. In addition, the storage device 2 compares a restored block 25 with the block 25 read in operation 63. If data of the two blocks is the same, the storage device 2 writes the block 1 into the storage medium.

Operation 7: The storage device 2 notifies the control device that reconstruction of the block is completed, and the control device continues to perform operation 1 through the CPU or completes reconstruction.

According to the method provided in this embodiment of the present disclosure, the control device directly reconstructs the lost first block in the first stripe based on the obtained first result from the target quantity of storage devices, so that the control device does not need to read an unlost block in the first stripe from the storage device. The control device may obtain the target quantity of first results from the storage device, to reconstruct the first block. An amount of data of the first result is less than that of the unlost block in the first stripe. Therefore, in the process of reconstructing the first block, there is a relatively small amount of data transmitted between the control device and the storage device. A transmission process occupies less network bandwidth and this improves block reconstruction performance. In addition, the first result sent by each storage device may be obtained provided that one second obtaining request is sent to each storage device, and there is no need to send a large quantity of read requests to each storage device. This reduces CPU overheads of the control device and further reduces network bandwidth occupation, to improve the block reconstruction performance. In addition, comparing whether content of the second block is the same as content of a reconstructed second block can avoid data silence. This improves system reliability.

Figure 10A:
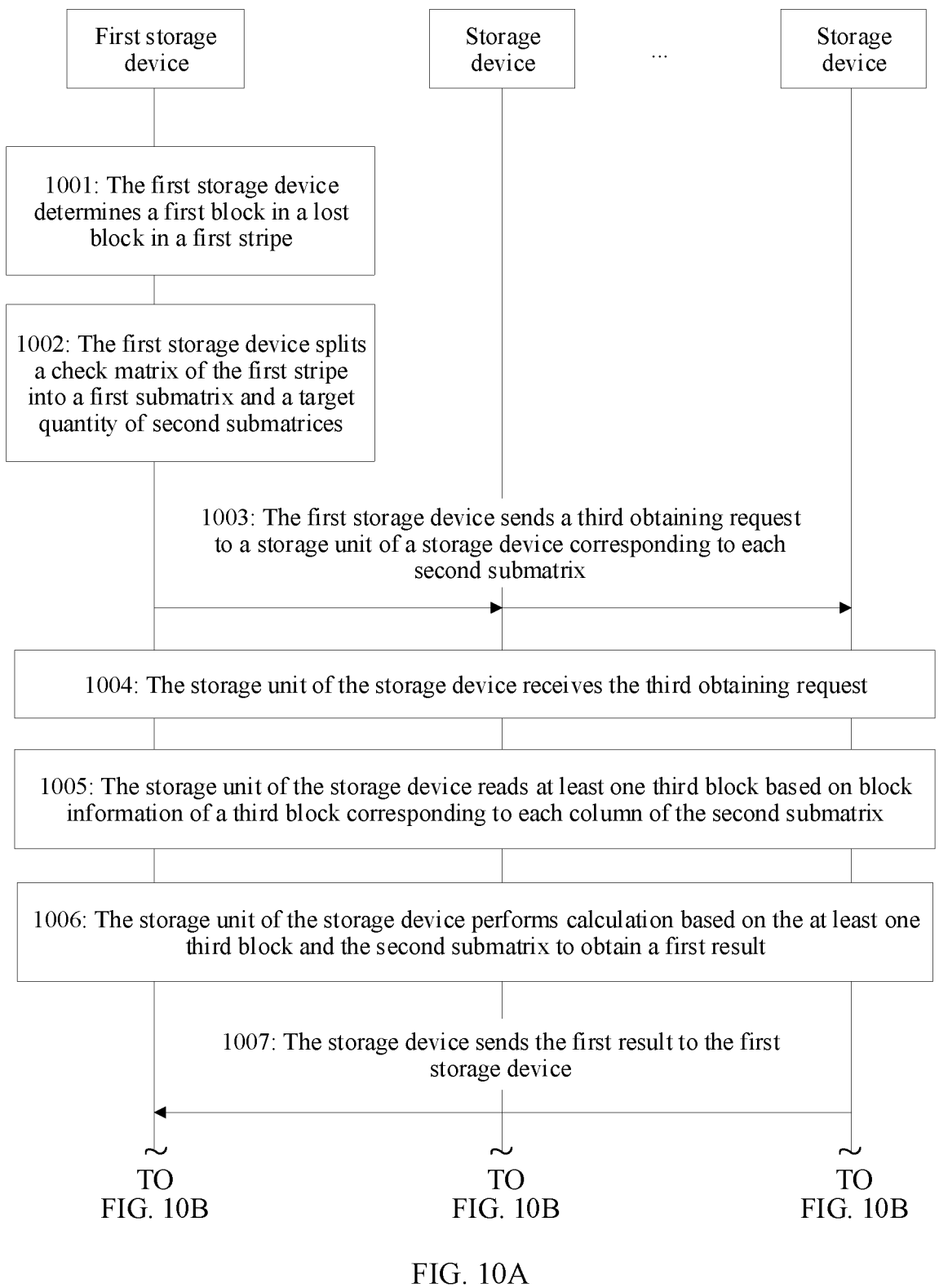
FIG. 10A and FIG. 10B are a flowchart of a data reconstruction method according to an embodiment of the present disclosure.
Figure 10B:
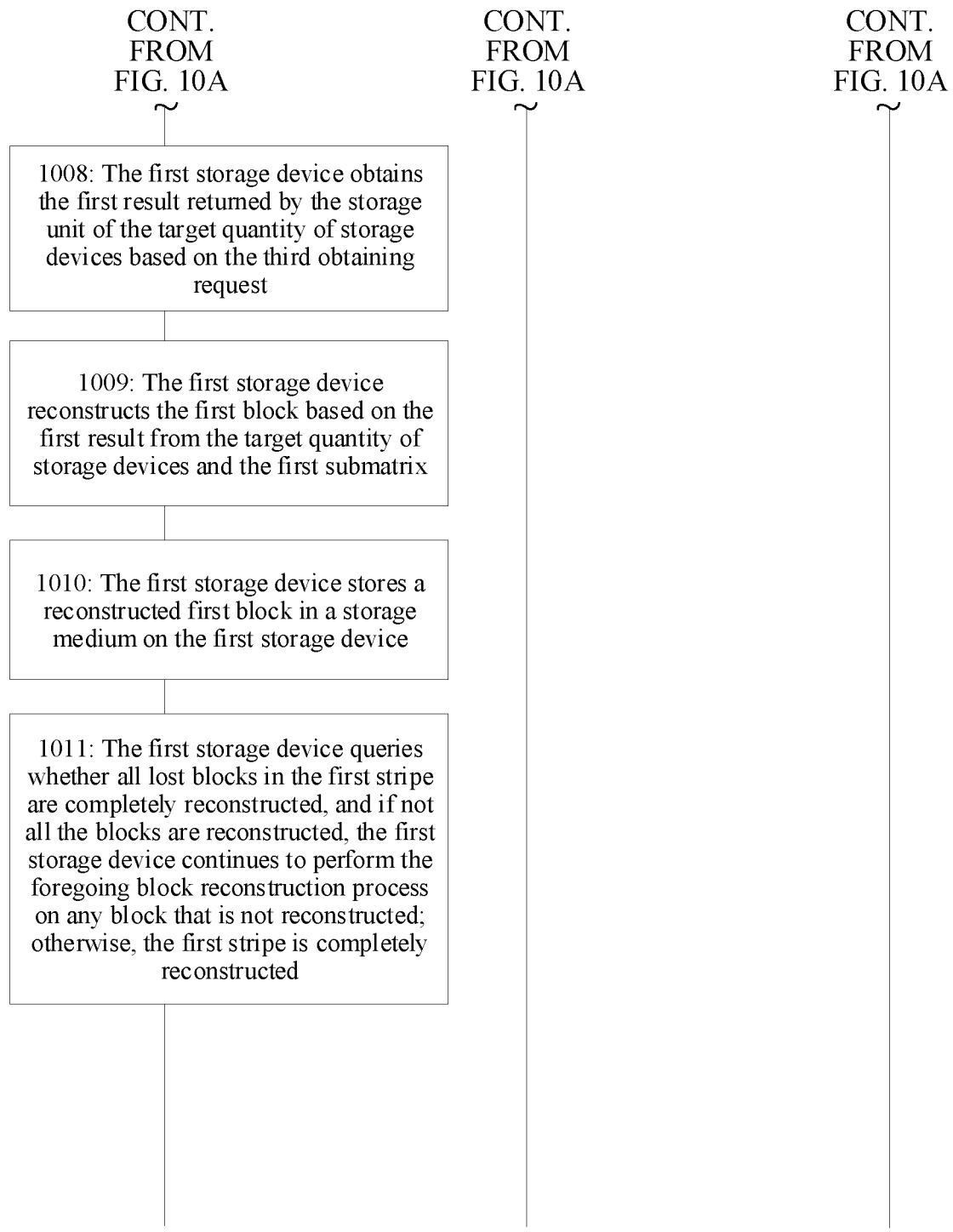

In some special application scenarios (for example, a cloud storage scenario in which storage and control are integrated), there is a device including a storage unit and a control unit and having functions of a control device, a storage device, and a target storage device. Such a device may reconstruct a lost block according to a flowchart of a data reconstruction method according to an embodiment of the present disclosure shown in FIG. 10A and FIG. 10B. The method includes the following operations.

1001: A first storage device determines a first block in a lost block in a first stripe, where a block in the first stripe is stored by a target quantity of storage devices, and the first storage device is any device in the target quantity of storage devices.

Each storage device includes a control unit and a storage unit. The first storage device may perform operation 1001 through the control unit of the first storage device. Before operation 1001, the first storage device may first query whether a block is lost in a storage medium in the storage unit of the first storage device. If a block is lost in the storage medium, the first storage device may first determine a specific stripe in which a block is lost, and then determine a specific lost block in the stripe.

When the entire storage medium is invalid, in an embodiment, the first storage device queries whether the storage medium on the first storage device in the target quantity of storage devices is invalid. If the storage medium on the first storage device is invalid, the first storage device determines, from a block stored in the invalid storage medium, the first block in the lost block in the first stripe. Specifically, when any medium in the storage medium on the first storage device is invalid, the first storage device determines, from an association table, at least one second stripe corresponding to an identifier of the any storage medium, uses any one of the at least one second stripe as the first stripe, and then determines at least one fourth block corresponding to both the identifier of the any storage medium and a stripe identifier of the first stripe. Then the first storage device determines any one of the at least one fourth block as the first block.

When the storage medium is partially invalid, in an embodiment, the first storage device queries whether a block is lost in the storage medium on the first storage device in the target quantity of storage devices. When at least one block is lost in any storage medium on the first storage device, the first storage device determines, from the at least one block, the first block in the lost block in the first stripe. In an embodiment, the first storage device determines, from the association table, the at least one second stripe corresponding to the at least one block, and then uses any one of the at least one second stripe as the first stripe. Then the first storage device determines any block, in the at least one fourth block corresponding to the at least one block, in the first stripe as the first block.

1002: The first storage device splits a check matrix of the first stripe into a first submatrix and the target quantity of second submatrices.

Operation 1002 may be performed by the control unit of the first storage device. Operation 1002 is similar to operation 303 in which the control device splits the check matrix of the first stripe into the first submatrix and the target quantity of second submatrices. Herein, operation 1002 is not described in detail in this embodiment of the present disclosure.

1003: The first storage device sends a third obtaining request to the storage unit of a storage device corresponding to each second submatrix, where the third obtaining request carries a second submatrix corresponding to a storage device, block information of a third block corresponding to each column of the second submatrix, and an identifier of the first storage device, and a second storage device is any device other than the first storage device in the target quantity of storage devices.

Each storage device has the storage unit. The storage unit of each storage device stores some blocks in the first stripe, and the storage unit of each storage device has a specific calculating capability. Therefore, the first storage device may send the third obtaining request to the storage unit of each storage device, so that the storage unit of each storage device may obtain a first result based on content of the third obtaining request.

The third obtaining request is used to indicate to send the first result to the first storage device. The third obtaining request is one type of obtaining request. The obtaining request carries the second submatrix corresponding to the storage device, the block information of the third block corresponding to each column of the second submatrix, and the identifier of the first storage device. When an identifier of the target device is the identifier of the first storage device, the obtaining request is the third obtaining request. In this case, the target device is the first storage device.

1004: The storage unit of the storage device receives the third obtaining request.

1005: The storage unit of the storage device reads at least one third block based on the block information of the third block corresponding to each column of the second submatrix.

Operation 1005 is similar to operation 306 in which the storage device obtains the at least one third block based on the block information of the third block corresponding to each column of the second submatrix. Herein, operation 1004 is not described in detail in this embodiment of the present disclosure.

1006: The storage unit of the storage device performs calculation based on the at least one third block and the second submatrix to obtain the first result.

Operation 1006 is similar to operation 307 in which the storage device obtains the first result. Herein, operation 1006 is not described in detail in this embodiment of the present disclosure.

1007: The storage unit of the storage device sends the first result to the first storage device.

It should be noted that all the storage units of the target quantity of storage devices need to perform processes shown in operations 1004 to 1007. It should be noted that the storage device in operations 1004 to 1007 includes the first storage device.

1008: The first storage device obtains the first result returned by the storage units of the target quantity of storage devices based on the third obtaining request.

Because all the storage units of the target quantity of storage devices need to perform operations 1004 to 1007, the first storage device obtains the first result returned by the storage units of the target quantity of storage devices based on the third obtaining request.

1009: The first storage device reconstructs the first block based on the first result from the target quantity of storage devices and the first submatrix.

Operation 1009 is similar to operation 310 in which the control device reconstructs the first block. Herein, operation 1009 is not described in detail in this embodiment of the present disclosure.

1010: The first storage device stores a reconstructed first block in the storage medium on the first storage device.

The storage medium on the first storage device may be any storage medium in the storage unit of the first storage device. After finishing storing the reconstructed first block, the first storage device may update information corresponding to the first block in the association table, so that all storage devices may subsequently read the reconstructed first block from the first storage device.

To avoid a silence error, before operation 1010, the first storage device obtains a second block from a storage device that stores the second block. If a reconstructed second block is the same as the obtained second block, the first storage device performs the operation of storing a reconstructed first block in the storage medium on the first storage device; otherwise, the first storage device skips performing the operation of storing a reconstructed first block in the storage medium on the first storage device, and prevents use of the first stripe. It should be noted that a process in which the first storage device reconstructs the second block is similar to a process in which the control device reconstructs the second block.

1011: The first storage device queries whether all lost blocks in the first stripe are completely reconstructed, and if not all the blocks are reconstructed, the first storage device continues to perform the foregoing block reconstruction process on any block that is not reconstructed; otherwise, the first stripe is completely reconstructed.

It should be noted that a block, lost in the first stripe, queried by the first storage device may be a block lost on the first storage device, or may be a block lost on another storage device.

Figure 11A:
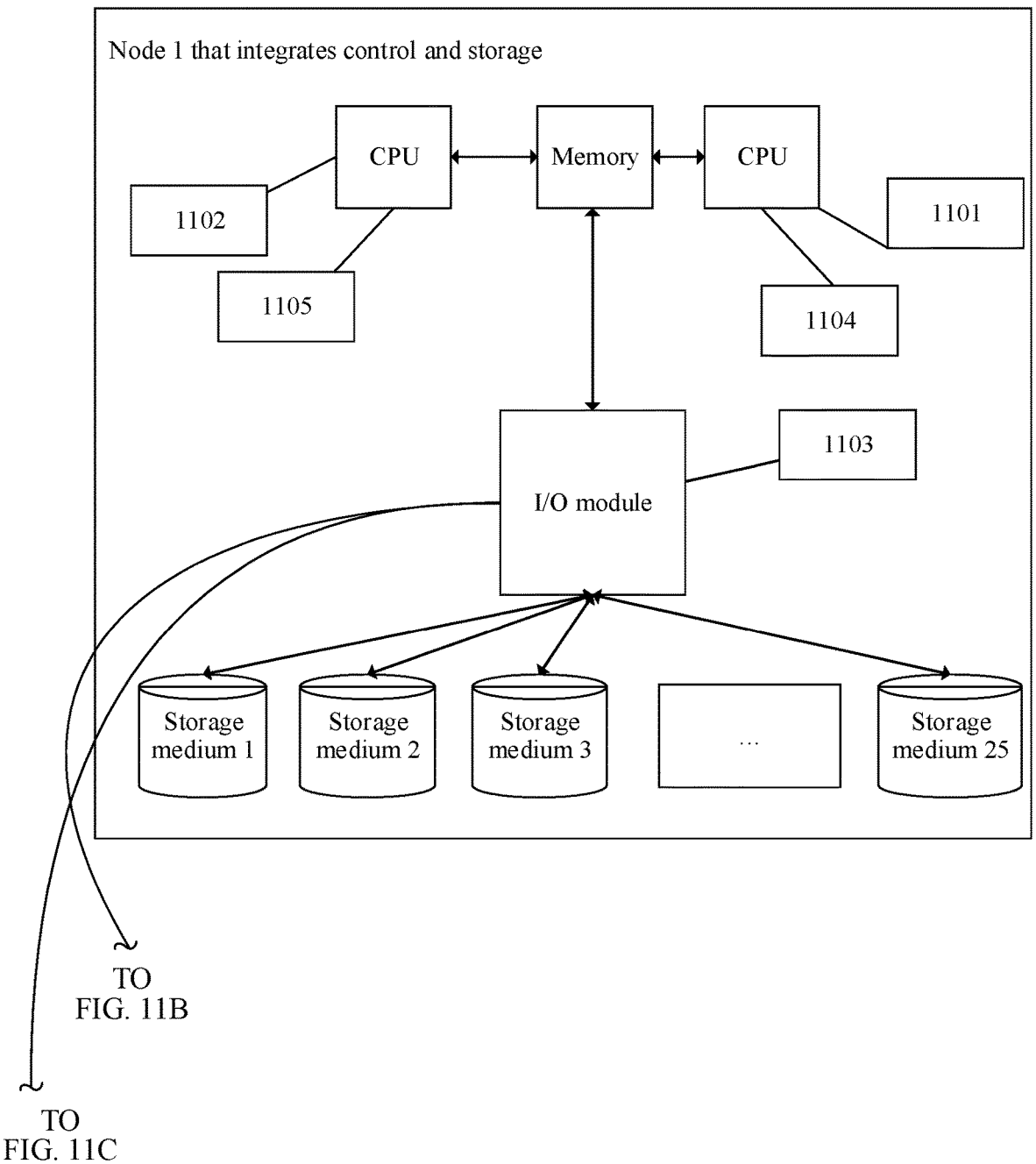
FIG. 11A, FIG. 11B, and FIG. 11C are a schematic diagram of a block reconstruction process according to an embodiment of the present disclosure.
Figure 11B:
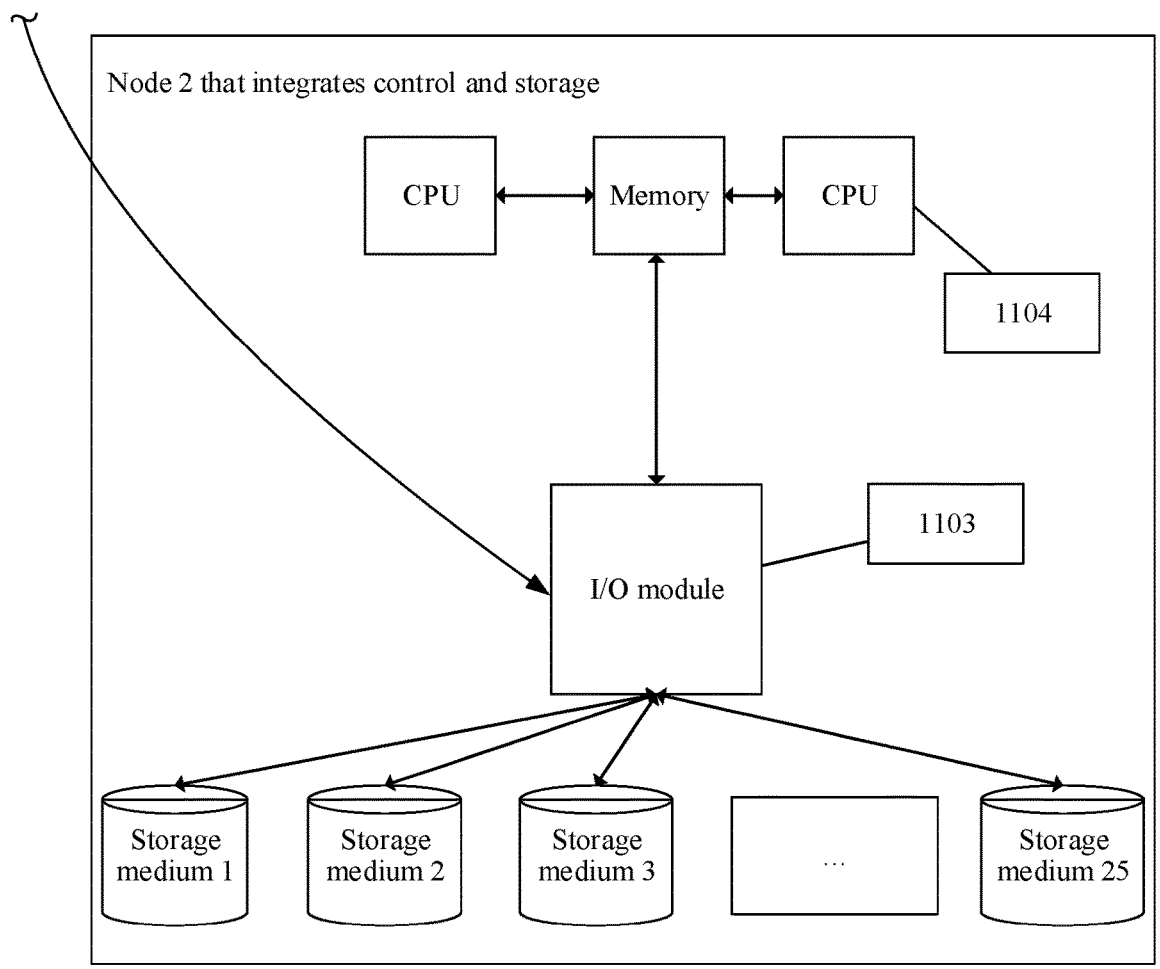
Figure 11C:
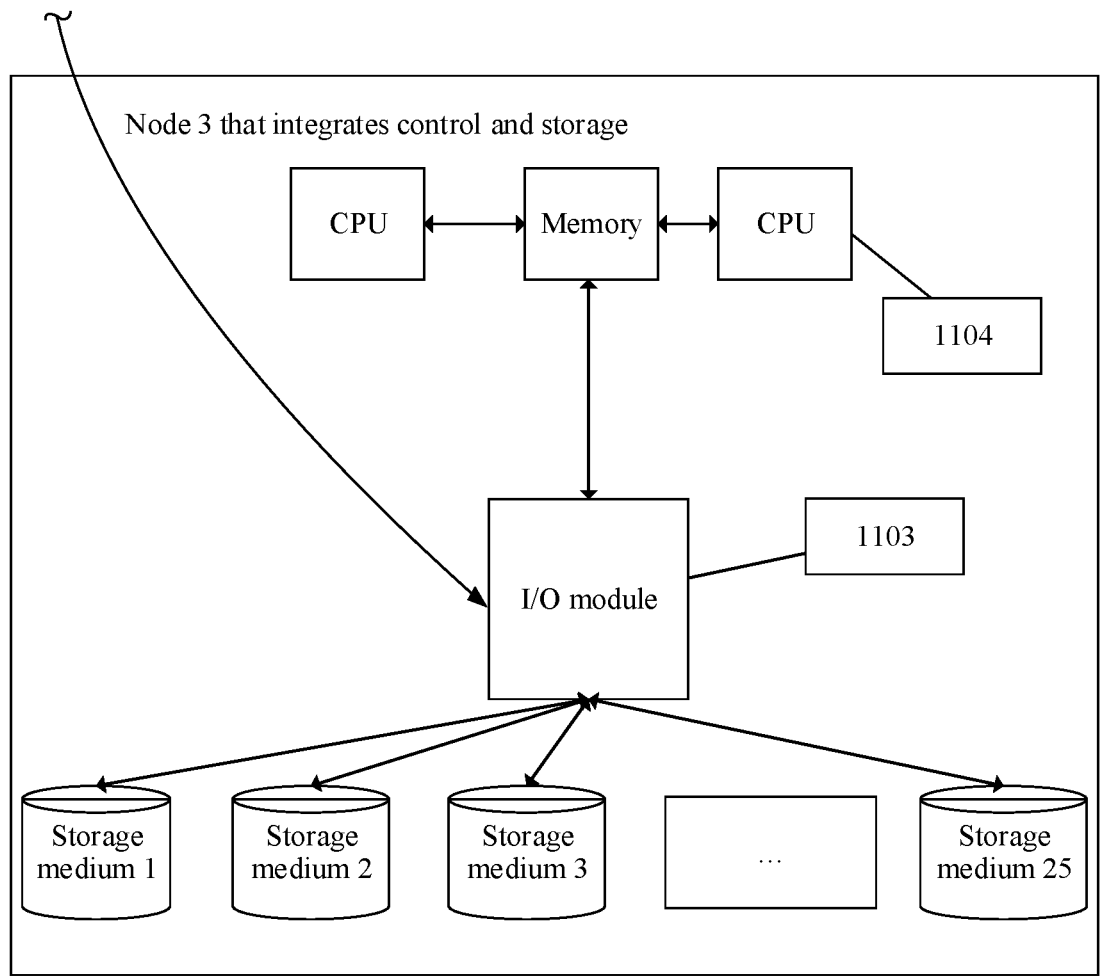

To further describe processes shown in operations 1001 to 1011, refer to a schematic diagram of a block reconstruction process according to an embodiment of the present disclosure shown in FIG. 11A, FIG. 11B, and FIG. 11C. In FIG. 11A, FIG. 11B, and FIG. 11C, 23+2 is used as an example. A block 1 is faulty (a fault may be a block loss), blocks 1 to 8 are on a node 1, blocks 9 to 16 are on a node 2, and blocks 17 to 25 are on a node 3. Each node is a storage device running a control unit and a storage unit (namely, a device integrating control and storage).

1101: A control unit of the node 1 initiates reconstruction, and finds a faulty block (the block 1) through scanning.

1102: The control unit of the node 1 groups, based on an enclosure, blocks in a stripe in which the block 1 is located, and needs to restore the block 1 and the block 25. The control unit of the node 1 splits a check matrix H into four submatrices ($H_{x1}$, $H_{x2}$, $H_{x3}$ and $H_{x4}$). The node 1 sends a request (a third obtaining request) to a storage unit of each node through an I/O unit.

The submatrices $H_{x1}$, $H_{x2}$, and $H_{x3}$ are second submatrices, and the submatrix $H_{x4}$ is a first submatrix. The control unit of the node 1 divides the blocks 2 to 24 into three groups: The blocks 2 to 8 are one group, and a storage unit of the node 1 performs calculation on the submatrix $H_{x1}$. The blocks 9 to 16 are one group, and a storage unit of the node 2 performs calculation on the submatrix $H_{x2}$. The blocks 17 to 24 are one group, and a storage unit of the node 3 performs calculation on the submatrix $H_{x3}$.

1103: After receiving the request, the storage unit of each node reads a block in a storage medium through an I/O unit.

The storage unit of the node 1 reads the blocks 2 to 8, the storage unit of the node 2 reads the blocks 9 to 16, and the storage unit of the node 3 reads the blocks 17 to 25.

1104: After reading the block, the storage unit of each node performs calculation to obtain an intermediate result (a first result).

The storage unit of the node 1 uses the submatrix $H_{x1}$ to perform calculation, to obtain an intermediate result $Q_{x1}$. The storage unit of the node 2 uses the submatrix $H_{x2}$ to perform calculation, to obtain $Q_{x2}$. The storage unit of the node 3 uses the submatrix $H_{x3}$ to perform calculation, to obtain $Q_{x3}$, where $Q_{x1}$, $Q_{x2}$, and $Q_{x3}$ are first results.

1105: The storage unit of each node sends the intermediate result to the node 1. The node 1 uses the intermediate results ($Q_{x1}$, $Q_{x2}$, and $Q_{x3}$) and the submatrix $H_{x4}$ to calculate a final result, and restores the block 1 and the block 25. The node 1 also writes a restored block 1 into the storage medium. The control unit of the node 1 continues to reconstruct another faulty block in the first stripe, or reconstruction is completed.

According to the method provided in this embodiment of the present disclosure, the first storage device directly reconstructs the lost first block in the first stripe based on the obtained first result from the target quantity of storage devices, so that the first storage device does not need to read an unlost block in the first stripe from another storage device. The first storage device only needs to obtain the target quantity of first results from the storage unit of the storage device, to reconstruct the first block. An amount of data of the first result is less than that of the unlost block in the first stripe. Therefore, in a process of reconstructing the first block, there is a relatively small amount of data transmitted between the first storage device and the another storage device. A data transmission process occupies less network bandwidth and this improves block reconstruction performance. In addition, the first result sent by the storage unit of each storage device may be obtained provided that one third obtaining request is sent to the storage unit of each storage device, and there is no need to send a large quantity of read requests to the storage unit of each storage device. This reduces CPU overheads of the control device and further reduces network bandwidth occupation, to improve the block reconstruction performance. In addition, comparing whether content of the reconstructed second block is the same as content of the obtained block can avoid data silence. This improves system reliability. In addition, in a scenario in which a control module accesses only one storage module, a reconstruction bandwidth between the control module and the storage module may be completely minimized.

Figure 12A:
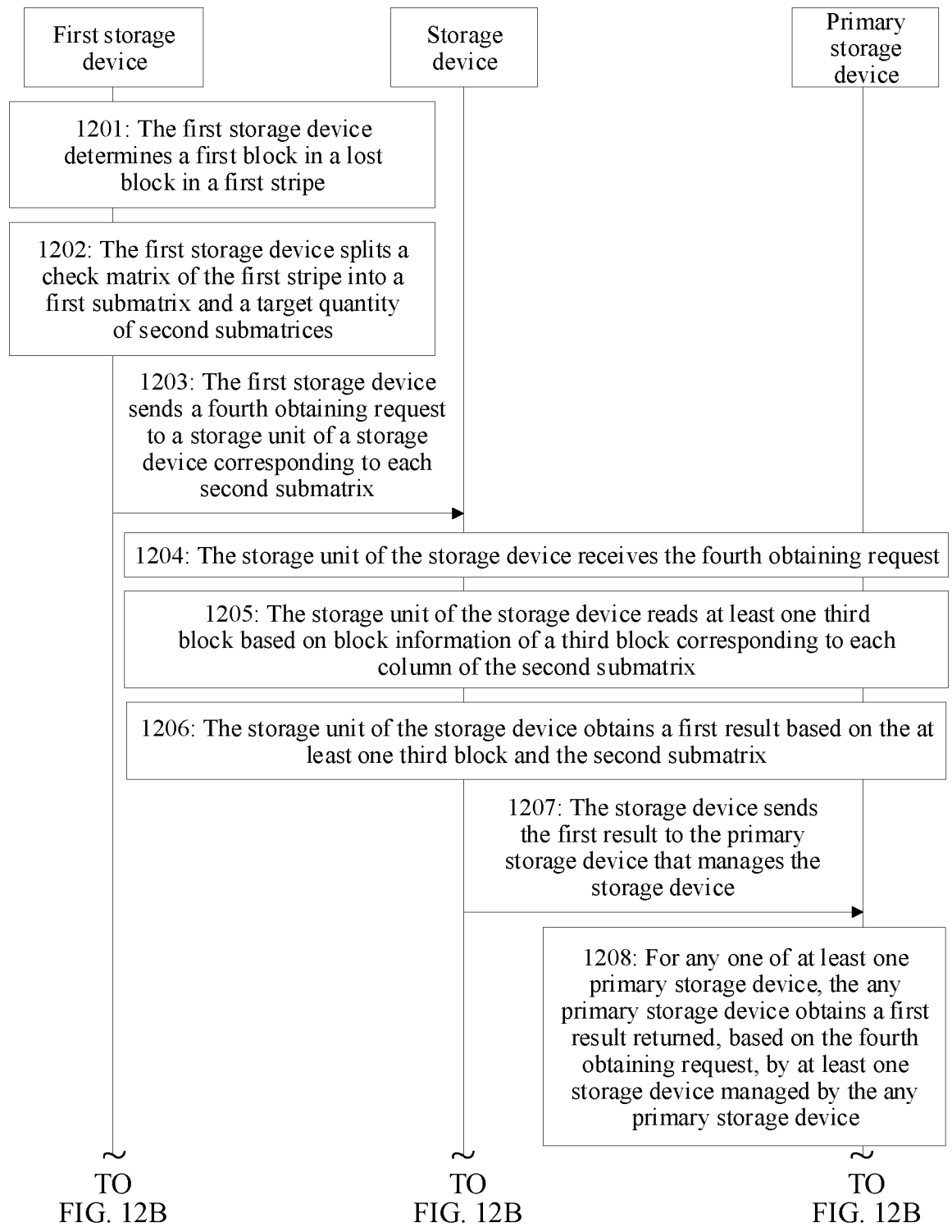
FIG. 12A and FIG. 12B are a flowchart of a data reconstruction method according to an embodiment of the present disclosure.
Figure 12B:
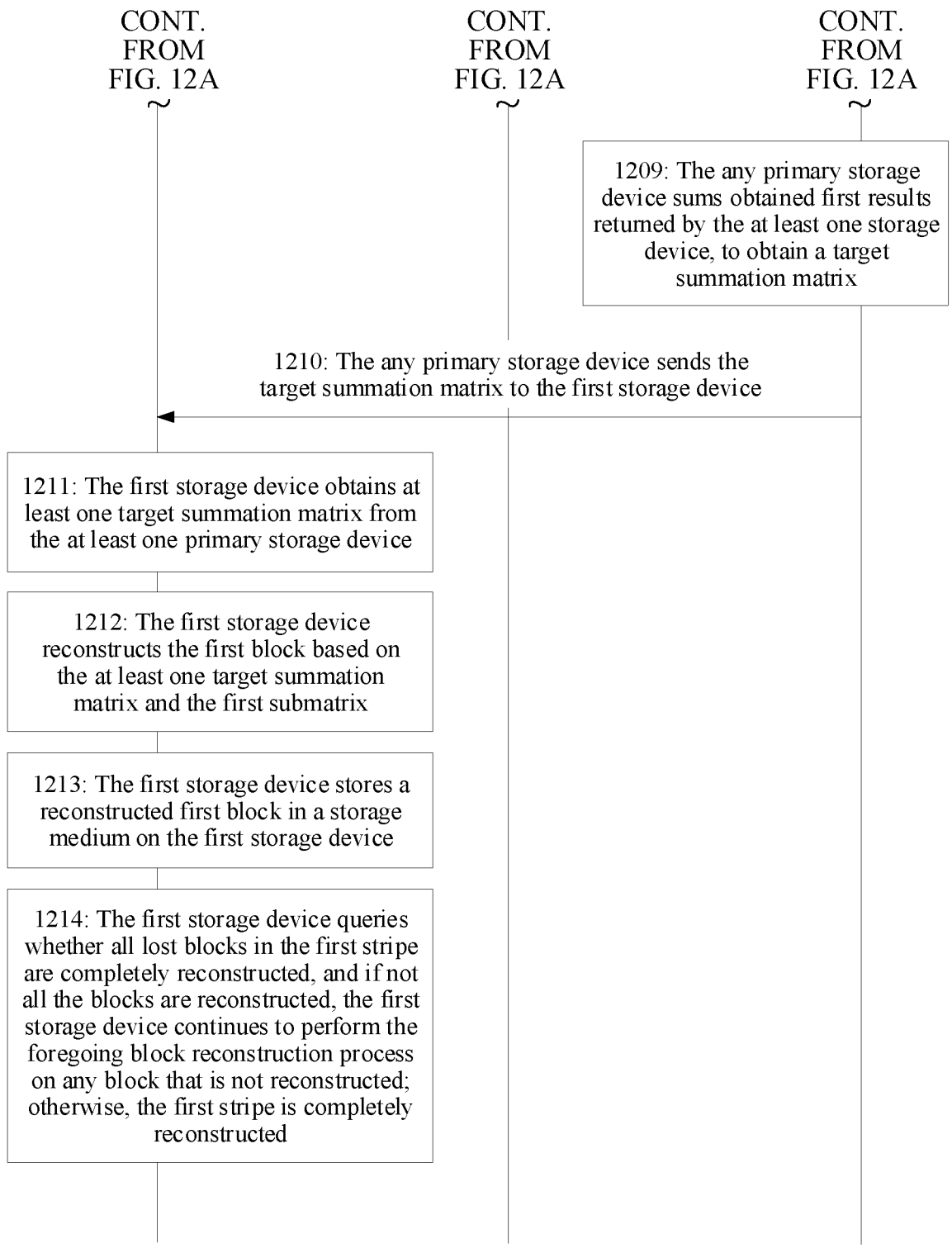

When a first stripe is stored in a plurality of disk enclosures or a plurality of AZs, a target quantity of storage devices may be managed by at least one primary storage device. The target quantity of storage devices may send, to a corresponding primary storage device, the first result generated by the storage unit of the target quantity of storage devices. Then the primary storage device sums obtained first results. A device for reconstructing a first block may obtain a summation matrix from the primary storage device, and reconstruct the first block based on the summation matrix. For description of this process, refer to a flowchart of a data reconstruction method according to an embodiment of the present disclosure shown in FIG. 12A and FIG. 12B. A procedure of the method includes the following operations.

1201: A first storage device determines the first block in a lost block in the first stripe, where a block in the first stripe is stored by the target quantity of storage devices.

A process shown in operation 1201 is similar to that shown in operation 1001. Operation 1201 is not described in detail in this embodiment of the present disclosure.

1202: The first storage device splits a check matrix of the first stripe into a first submatrix and the target quantity of second submatrices.

A process shown in operation 1202 is similar to that shown in operation 1002. Operation 1202 is not described in detail in this embodiment of the present disclosure.

1203: The first storage device sends a fourth obtaining request to a storage unit of a storage device corresponding to each second submatrix, where the fourth obtaining request carries a second submatrix corresponding to a storage device, block information of a third block corresponding to each column of the second submatrix, and an identifier of the primary storage device.

The fourth obtaining request is used to indicate to send the first result to the primary storage device. The fourth obtaining request is one type of obtaining request. The obtaining request carries the second submatrix corresponding to the storage device, the block information of the third block corresponding to each column of the second submatrix, and an identifier of a target device. When the identifier of the target device is the identifier of the primary storage device, the obtaining request is the fourth obtaining request. In this case, the target device is the primary storage device.

1204: The storage unit of the storage device receives the fourth obtaining request.

1205: The storage unit of the storage device reads at least one third block based on the block information of the third block corresponding to each column of the second submatrix.

A process shown in operation 1205 is similar to that shown in operation 1005. Operation 1205 is not described in detail in this embodiment of the present disclosure.

1206: The storage unit of the storage device performs calculation based on the at least one third block and the second submatrix to obtain the first result.

A process shown in operation 1206 is similar to that shown in operation 1006. Operation 1206 is not described in detail in this embodiment of the present disclosure.

1207: The storage device sends the first result to the primary storage device that manages the storage device.

It should be noted that all the target quantity of storage devices only perform processes shown in operations 1204 to 1207.

1208: For any one of the at least one primary storage device, the any primary storage device obtains a first result returned, based on the fourth obtaining request, by at least one storage device managed by the any primary storage device.

1209: The any primary storage device sums obtained first results returned by the at least one storage device, to obtain a target summation matrix.

The target summation matrix is a sum of the first results returned by the at least one storage device based on the fourth obtaining request.

1210: The any primary storage device sends the target summation matrix to the first storage device.

Because each storage device sends a first result to a corresponding primary storage device, each of the at least one primary storage device performs processes shown in operations 1208 to 1210.

1211: The first storage device obtains at least one target summation matrix from the at least one primary storage device.

Because each of the at least one primary storage device performs the processes shown in operations 1208 to 1210, the first storage device obtains a target summation matrix from the at least one primary storage device (obtains the at least one target summation matrix).

1212: The first storage device reconstructs the first block based on the at least one target summation matrix and the first submatrix.

A control unit of the first storage device may: sum the at least one target summation matrix to obtain a summation matrix; obtain a target block matrix based on an inverse matrix of the first submatrix and the summation matrix; use a first target row of the target block matrix as a reconstructed first block; and use a second target row of the target block matrix as a reconstructed second block.

It should be noted that a process shown in operation 1212 is a process of reconstructing the first block based on the first result from the target quantity of storage devices.

1213: The first storage device stores a reconstructed first block in a storage medium on the first storage device.

A process shown in operation 1213 is similar to that shown in operation 1011. Operation 1213 is not described in detail in this embodiment of the present disclosure. It should be noted that a block, lost in the first stripe, queried by the first storage device may be a block lost on the first storage device, or may be a block lost on another storage device.

To avoid a silence error, before operation 1213, the first storage device obtains a second block from a storage device that stores the second block. If the reconstructed second block is the same as the obtained second block, the first storage device performs the operation of storing a reconstructed first block in the storage medium on the first storage device; otherwise, the first storage device skips performing the operation of storing a reconstructed first block in the storage medium on the first storage device, and prevents use of the first stripe. It should be noted that a process in which the first storage device reconstructs the second block is similar to a process in which a control device reconstructs the second block.

1214: The first storage device queries whether all lost blocks in the first stripe are completely reconstructed, and if not all the blocks are reconstructed, the first storage device continues to perform the foregoing block reconstruction process on any block that is not reconstructed; otherwise, the first stripe is completely reconstructed.

A process shown in operation 1214 is similar to that shown in operation 1012. Operation 1214 is not described in detail in this embodiment of the present disclosure.

Figure 13A:
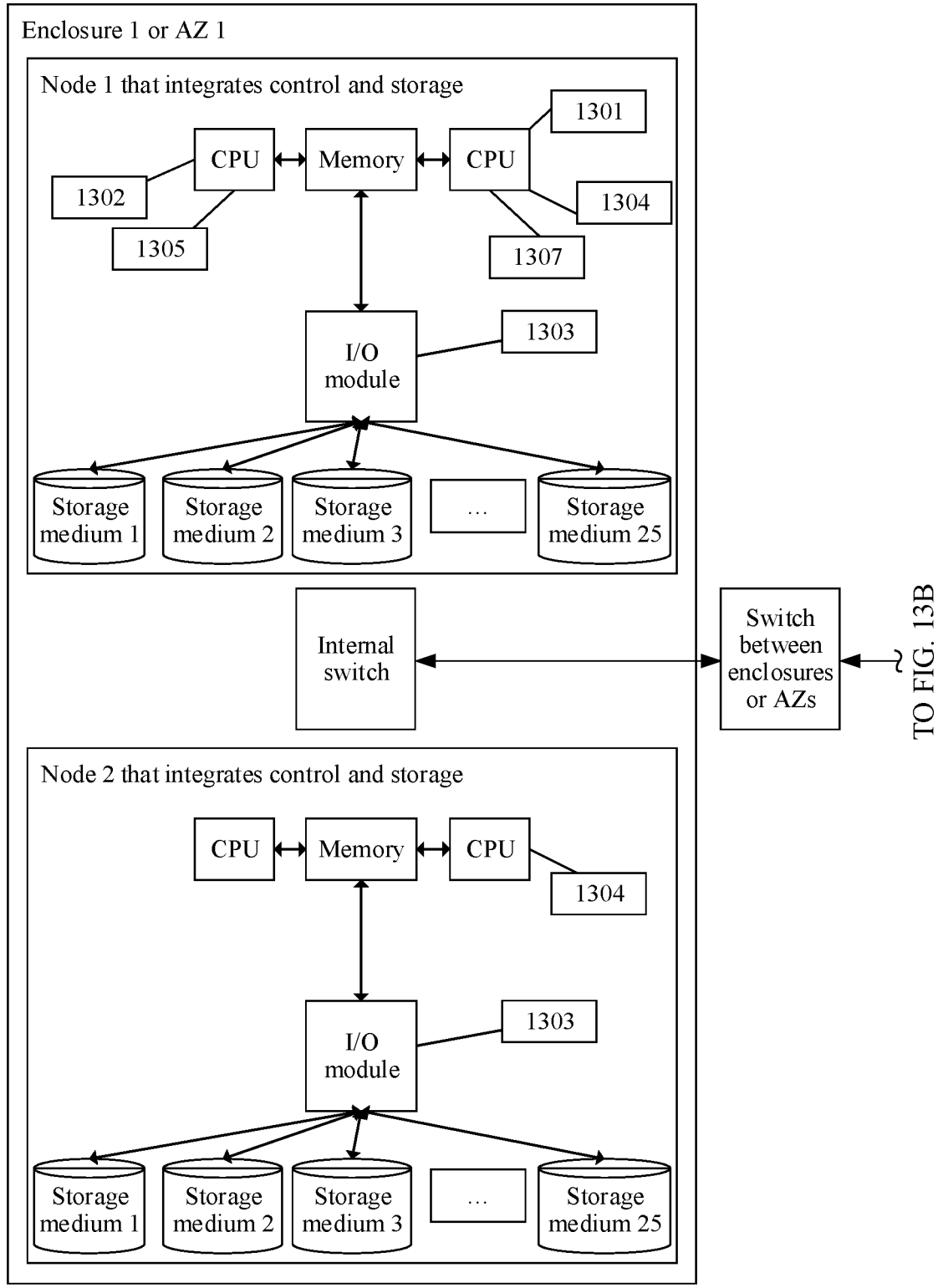
FIG. 13A and FIG. 13B are a schematic diagram of a block reconstruction process according to an embodiment of the present disclosure.
Figure 13B:
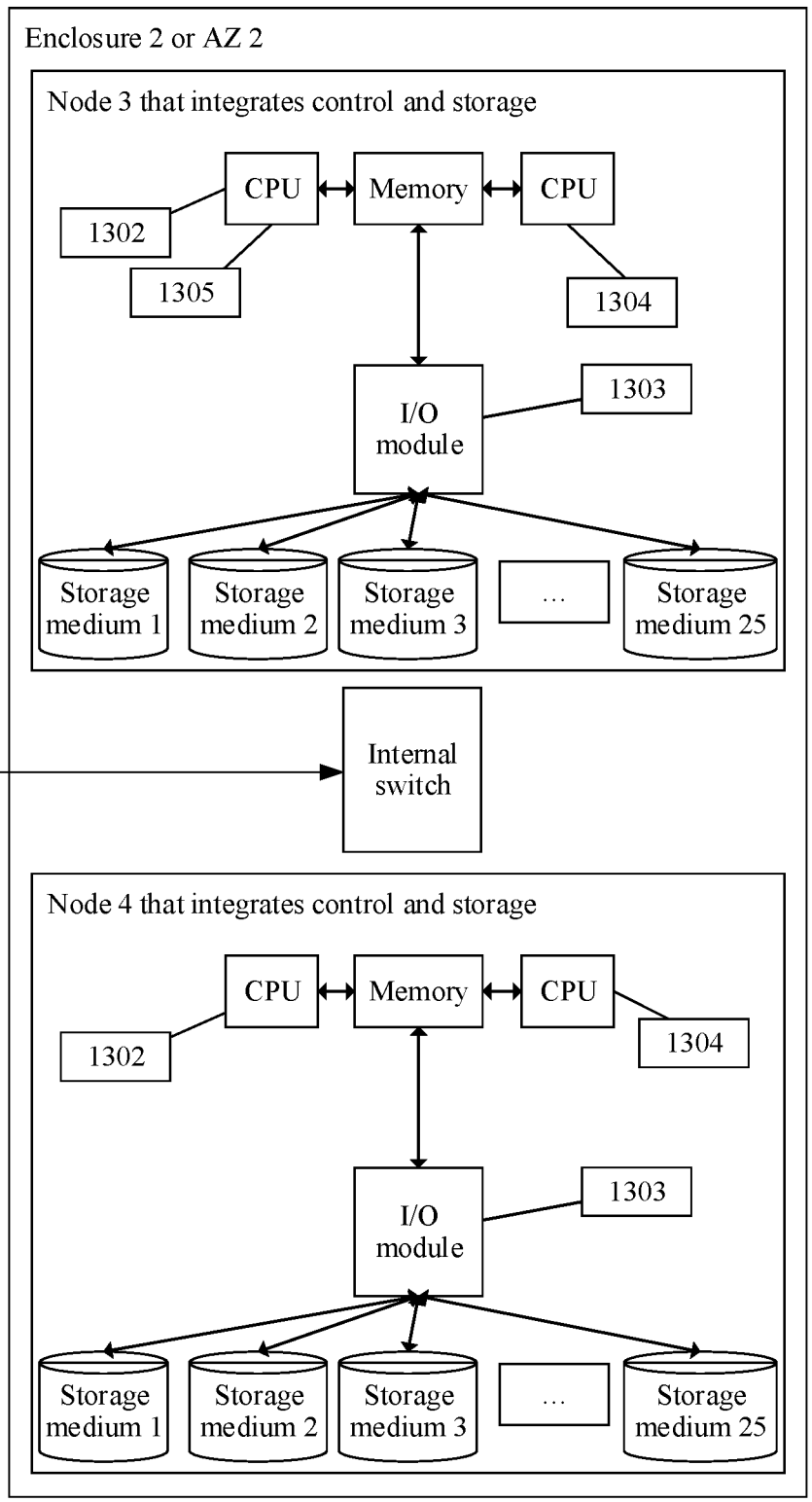

To further describe processes shown in operations 1201 to 1214, refer to a schematic diagram of a block reconstruction process according to an embodiment of the present disclosure shown in FIG. 13A and FIG. 13B. In FIG. 13A and FIG. 13B, 23+2 is used as an example. A block 1 is a faulty block, and the block 1 and a block 25 need to be restored. Blocks 1 to 6 are on a node 1, blocks 7 to 12 are on a node 2, blocks 13 to 18 are on a node 3, and blocks 19 to 25 are on a node 4. The node 1 and the node 2 are in an enclosure 1 or an AZ 1, and the node 3 and the node 4 are in an enclosure 2 or an AZ 2. Each node is a storage device running a control unit and a storage unit.

1301: A control unit of the node 1 initiates reconstruction, and finds a faulty block (the block 1) through scanning.

1302: The control unit of the node 1 groups, based on an enclosure, blocks in a stripe in which the block 1 is located. The control unit of the node 1 splits a check matrix H into five submatrices ($H_{y1}$, $H_{y2}$, $H_{y3}$, $H_{y4}$, and $H_{y5}$), and the node 1 sends a request (a fourth obtaining request) to a storage unit of each node through an I/O unit.

The submatrices $H_{y1}$, $H_{y2}$, $H_{y3}$, and $H_{y4}$ are second submatrices, and the submatrix $H_{y5}$ is a first submatrix. The control unit of the node 1 divides the blocks 2 to 24 into four groups: The blocks 2 to 6 are one group, and a storage unit of the node 1 performs calculation on the submatrix $H_{y1}$. The blocks 7 to 12 are one group, and a storage unit of the node 2 performs calculation on the submatrix $H_{y2}$. The blocks 13 to 18 are one group, and a storage unit of the node 3 performs calculation on the submatrix $H_{y3}$. The blocks 19 to 24 are one group, and a storage unit of the node 4 performs calculation on the submatrix $H_{y4}$

1303: After receiving the request, the storage unit of each node reads a block in a storage medium through an I/O unit.

The storage unit of the node 1 reads the blocks 2 to 6. The storage unit of the node 2 reads the blocks 7 to 12. The storage unit of the node 3 reads the blocks 13 to 18. The storage unit of the node 4 reads the blocks 19 to 24.

1304: After reading the block, the storage unit of each node performs calculation to obtain an intermediate result (a first result).

The storage unit of the node 1 performs calculation on the submatrix $H_{y1}$ and a third block corresponding to the submatrix $H_{y1}$, to obtain an intermediate result $Q_{y1}$. The storage unit of the node 2 performs calculation on the submatrix $H_{y2}$ and a third block corresponding to the submatrix $H_{y2}$, to obtain $Q_{y2}$. The storage unit of the node 3 performs calculation on the submatrix $H_{y3}$ and a third block corresponding to the submatrix $H_{y3}$, to obtain $Q_{y3}$. The storage unit of the node 4 performs calculation on the submatrix $H_{y4}$ and a third block corresponding to the submatrix $H_{y4}$, to obtain $Q_{y4}$, where $Q_{y1}$, $Q_{y2}$, $Q_{y3}$, and $Q_{y4}$ are first results.

1305: The storage unit of each node sends the intermediate result to a primary node (a primary storage device) in an enclosure or an AZ, and each primary node calculates a target summation matrix.

The node 2 sends $Q_{y2}$ to the node 1 (a primary storage device) through an internal switch. The node 1 performs an addition operation on the intermediate results ($Q_{y2}$ and $Q_{y1}$) to obtain a target summation matrix $T_1$. The node 4 sends $Q_{y4}$ to the node 3 (a primary storage device) through an internal switch. The node 3 performs an addition operation on the intermediate results ($Q_{y,3}$ and $Q_{y,4}$) to obtain a target summation matrix $T_2$.

1306: The primary node 3 sends the calculated target summation matrix to the node 1 through a switch between enclosures or AZs.

1307: The node 1 uses the target summation matrix and the submatrix $H_{y,5}$ to calculate a final result, and restores the block 1 and the block 25. The node 1 also writes a restored block 1 into the storage medium. The control unit of the node 1 continues to reconstruct another faulty block, or reconstruction is completed.

According to the method provided in this embodiment of the present disclosure, the first storage device splits the check matrix of the first stripe into the first submatrix and the target quantity of second submatrices, and sends a split second submatrix to a storage unit of a corresponding storage device. The storage unit of each storage device generates the first result. Each storage device sends the generated first result to the primary storage device. The primary storage device first sums received first results to obtain the target summation matrix, and then sends the target summation matrix to the first storage device. Finally, the first storage device reconstructs the first block based on the at least one target summation matrix and the first submatrix. In this process, the first storage device does not need to read an unlost block in the first stripe from another storage device. The first storage device only needs to obtain a target first result from the primary storage device, to reconstruct the first block. An amount of data of the first result or the target first result is less than that of the unlost block in the first stripe. Therefore, in a process of reconstructing the first block, there is a relatively small amount of data transmitted between the first storage device and the another storage device. A data transmission process occupies less network bandwidth and this improves block reconstruction performance. If the at least one primary storage device is in different disk enclosures, data exchanged between the disk enclosures is only the second submatrix. Therefore, an amount of data exchanged between the disk enclosures can be reduced. In addition, each primary storage device may obtain the first result sent by the storage unit of each storage device provided that one fourth obtaining request is sent to the storage unit of each storage device, and there is no need to send a large quantity of read requests to the storage unit of each storage device. This reduces CPU overheads of the control device and further reduces network bandwidth occupation, to improve the block reconstruction performance. In addition, comparing whether content of the reconstructed second block is the same as content of the obtained block can avoid data silence. This improves system reliability.

Figure 14:
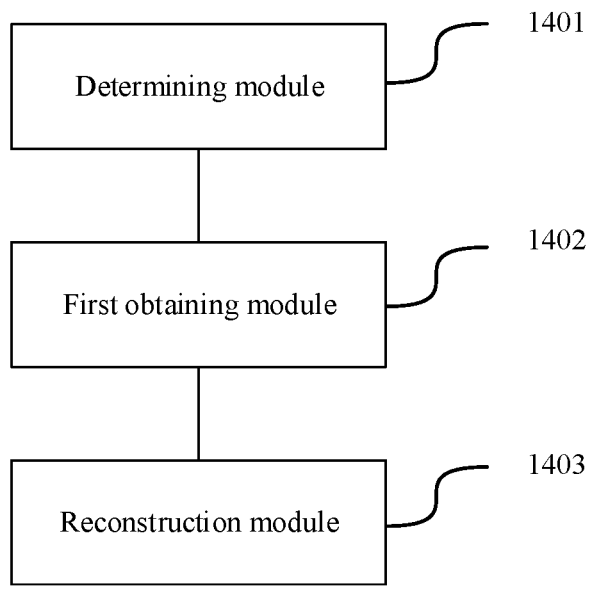
FIG. 14 is a schematic structural diagram of a data reconstruction apparatus according to an embodiment of the present disclosure.

FIG. 14 is a schematic structural diagram of a data reconstruction apparatus according to an embodiment of the present disclosure. The apparatus includes a determining module 1401, a first obtaining module 1402, and a reconstruction module 1403.

The determining module 1401 is configured to perform operation 302.

The first obtaining module 1402 is configured to obtain a first result from a target quantity of storage devices. Each first result is obtained after one of the target quantity of storage devices reads a stored valid block in a first stripe and performs calculation based on the read valid block.

The reconstruction module 1403 is configured to reconstruct a first block based on the first result from the target quantity of storage devices.

Optionally, the apparatus further includes a splitting module, configured to perform operation 303.

The reconstruction module 1403 is configured to perform operation 301.

Optionally, the reconstruction module 1403 is configured to:
sum first results from the target quantity of storage devices, to obtain a summation matrix;
obtain a target block matrix based on an inverse matrix of a first submatrix and the summation matrix; and
determine a first target row of the target block matrix as a reconstructed first block.

In an embodiment, the apparatus further includes:
a first sending module, configured to perform operation 304, where the first obtaining module 1402 is configured to perform operation 309.

In an embodiment, the first sending module is configured to perform operation 311.

In an embodiment, the apparatus further includes an execution module, where
the first obtaining module 1402 is further configured to obtain a second block from a storage device that stores the second block;
the reconstruction module 1403 is further configured to reconstruct the second block based on the first result from the target quantity of storage devices and the first submatrix; and
the execution module is configured to: if a reconstructed second block is the same as the obtained second block, perform the operation of sending a write request to the target storage device; otherwise, skip performing the operation of sending a write request to the target storage device, and prevent use of the first stripe.

In an embodiment, the apparatus further includes:
a second sending module, configured to perform operation 804, where
the second sending module is further configured to perform operation 805; and
a first receiving module, configured to perform operation 813.

In an embodiment, the apparatus further includes:
a second receiving module, configured to receive a first reconstruction request, where the first reconstruction request carries a storage medium identifier of an invalid storage medium on a storage device, where
the determining module 1401 is further configured to perform operations 21 to 23.

In an embodiment, the apparatus further includes:
a third receiving module, configured to receive a second reconstruction request, where the second reconstruction request carries block information of at least one block lost in a storage medium on a storage device, where
the determining module 1401 is further configured to perform operations 2A to 2C.

In an embodiment, the apparatus further includes:
a first query module, configured to perform operation 1012.

In an embodiment, the apparatus further includes:
a second query module, configured to query whether a storage medium on a first storage device in the target quantity of storage devices is invalid, where
the determining module 1401 is further configured to: if the storage medium on the first storage device is invalid, determine, from a block stored in the invalid storage medium, the first block in a lost block in the first stripe.

In an embodiment, the apparatus further includes:
a third query module, configured to query whether a block in the storage medium on the first storage device in the target quantity of storage devices is lost, where
the determining module 1401 is further configured to: when at least one block is lost in any storage medium on the first storage device, determine, from the at least one block, the first block in the lost block in the first stripe.

In an embodiment, the apparatus further includes:
a third sending module, configured to perform operation 1003; and
a second obtaining module, configured to perform operation 1008.

In an embodiment, the apparatus further includes:
a third obtaining module, configured to perform operation 1204, where
the third obtaining module is further configured to perform operation 1211, and
the reconstruction module 1403 is further configured to perform operation 1012.

In an embodiment, the reconstruction module 1403 is further configured to:
sum the at least one target summation matrix to obtain a summation matrix;
obtain the target block matrix based on the inverse matrix of the first submatrix and the summation matrix; and
determine the first target row of the target block matrix as the reconstructed first block.

Figure 15:
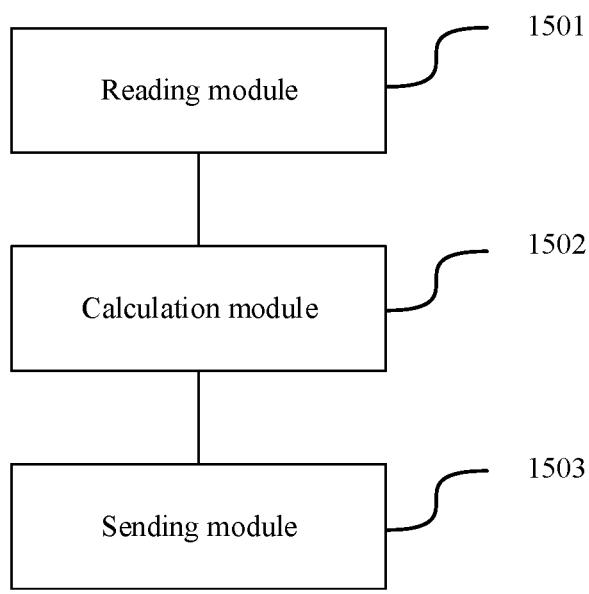
FIG. 15 is a schematic structural diagram of a data reconstruction apparatus according to an embodiment of the present disclosure.

FIG. 15 is a schematic structural diagram of a data reconstruction apparatus according to an embodiment of the present disclosure. The apparatus includes a reading module 1501, a calculation module 1502, and a sending module 1503.

The reading module 1501 is configured to read a valid block, in a first stripe, stored on a storage device. The first stripe is stored by a target quantity of storage devices.

The calculation module 1502 is configured to perform calculation based on the read valid block, to obtain a first result.

The sending module 1503 is configured to perform operation 308.

In an embodiment, the apparatus further includes:
a receiving module, configured to receive an obtaining request, where the obtaining request carries a second submatrix corresponding to the storage device, block information of a third block corresponding to each column of the second submatrix, and an identifier of a target device, the second submatrix includes a column corresponding to at least one third block, stored on a corresponding storage device, in the first stripe, the second block is any unlost block in the first stripe, and the third block is any block other than the second block in the any unlost block, where
the reading module 1501 is configured to perform operation 1205; and
the calculation module 1502 is configured to perform operation 1206.

In an embodiment, the calculation module 1502 is further configured to:
form a block matrix by using the at least one third block, where each row of the block matrix is one third block; and
multiply the second submatrix by the block matrix to obtain the first result.

In an embodiment, the target device includes a control device, a target storage device, a first storage device, and at least one primary storage device. The first storage device is any device in the target storage device. The at least one primary storage device is configured to manage the target quantity of storage devices.

When the identifier of the target device is an identifier of the control device, the obtaining request is a first obtaining request and is used to indicate to send the first result to the control device.

When the identifier of the target device is an identifier of the target storage device, the obtaining request is a second obtaining request and is used to indicate to send the first result to the target storage device.

When the identifier of the target device is an identifier of the first storage device, the obtaining request is a third obtaining request and is used to indicate to send the first result to the first storage device.

When the identifier of the target device is an identifier of the primary storage device, the obtaining request is a fourth obtaining request and is used to indicate to send the first result to the primary storage device.

In an embodiment, the apparatus further includes:
a first query module, configured to query whether a storage medium on the storage device is invalid, where
the sending module 1503 is further configured to: when the storage medium on the storage device is invalid, send a first reconstruction request to the control device, where the first reconstruction request carries a storage medium identifier of the invalid storage medium on the storage device.

In an embodiment, the apparatus further includes:
a second query module, configured to query whether a block in the storage medium on the storage device is lost, where
the sending module 1503 is further configured to: when at least one block in any storage medium on the storage device is lost, send a second reconstruction request to the control device, where the second reconstruction request carries block information of the at least one block.

Figure 16:
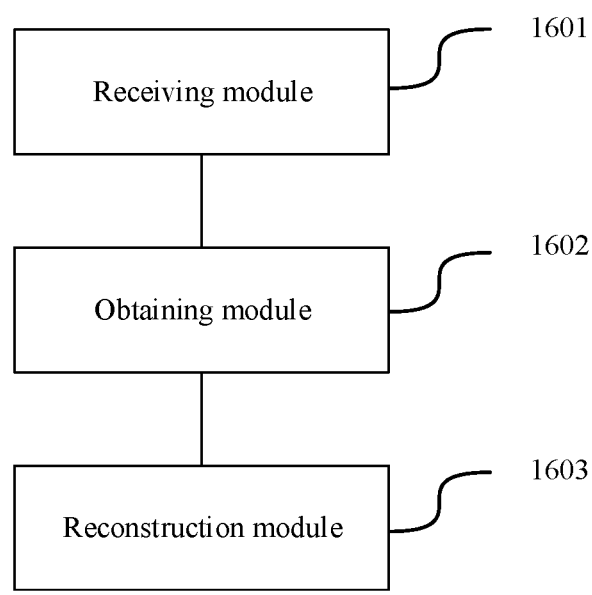
FIG. 16 is a schematic structural diagram of a data reconstruction apparatus according to an embodiment of the present disclosure.

FIG. 16 is a schematic structural diagram of a data reconstruction apparatus according to an embodiment of the present disclosure. The apparatus includes a receiving module 1601, an obtaining module 1602, and a reconstruction module 1603.

The receiving module 1601 is configured to receive a target reconstruction request. The target reconstruction request carries a first submatrix. The target reconstruction request is used to indicate to reconstruct, based on the first submatrix, a first block in a lost block in a first stripe. The first submatrix includes a column corresponding to the first block in the lost block in the first stripe and a column corresponding to a second block. The second block is any unlost block in the first stripe.

The obtaining module 1602 is configured to perform operation 810.

The reconstruction module 1603 is configured to perform operation 811.

In an embodiment, the reconstruction module 1603 is further configured to:
sum first results from a target quantity of storage devices, to obtain a summation matrix;
obtain a target block matrix based on an inverse matrix of the first submatrix and the summation matrix; and
determine a first target row of the target block matrix as a reconstructed first block.

In an embodiment, the apparatus further includes:
a storage module, configured to perform step operation 812; and
a sending module, configured to perform operation 813.

In an embodiment, the apparatus further includes an execution module, where
the obtaining module 1602 is further configured to obtain the second block from a storage device that stores the second block;
the reconstruction module 1603 is further configured to reconstruct the second block based on the first result from the target quantity of storage devices and the first submatrix; and
the execution module is configured to: if a reconstructed second block is the same as the obtained second block, perform the operation of storing the reconstructed first block;
otherwise, skip performing the operation of storing the reconstructed first block, and prevent use of the first stripe.

All of the foregoing technical solutions may form optional embodiments of this disclosure through any combination. Details are not described herein again.

It should be noted that when the data reconstruction apparatus provided in the foregoing embodiments reconstructs a block, division of the foregoing functional modules is used only as an example for description. In actual application, the foregoing functions may be allocated to different functional modules as required. In other words, an internal structure of the apparatus is divided into different functional modules to complete all or some of the described functions. In addition, the data reconstruction method embodiments provided in the foregoing embodiments pertain to a same concept. For a specific implementation process, refer to the method embodiments. Details are not described herein again.

A person of ordinary skill in the art may understand that all or some of the operations of the embodiments may be implemented by hardware or a program instructing related hardware. The program may be stored in a computer-readable storage medium. The storage medium may be a read-only memory, a storage medium, or an optical disc.

The foregoing descriptions are merely example embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A data reconstruction method, wherein the method comprises:
   determining a first block in a lost block in a first stripe, wherein a block in the first stripe is stored by a target quantity of storage devices;
   splitting a check matrix of the first stripe into a first submatrix and a target quantity of second submatrices, wherein the first submatrix comprises a column corresponding to the first block and a column corresponding to a second block, each second submatrix comprises a column corresponding to at least one third block, stored on one storage device, in the first stripe, the second block is any block in the stored valid block in the first stripe, and the at least one third block is any block other than the second block in the stored valid block;
   obtaining a first result from each of the target quantity of storage devices, wherein each first result is obtained after one of the target quantity of storage devices reads a stored valid block in the first stripe and performs calculation based on the stored valid block that is read, wherein an amount of data of the first result is less than that of a unlost block in the first stripe; and
   reconstructing the first block based on the first results from the target quantity of storage devices and the first submatrix.

2. The method according to claim 1, wherein the reconstructing the first block based on the first results from the target quantity of storage devices and the first submatrix comprises:
   summing the first results from the target quantity of storage devices to obtain a summation matrix;
   obtaining a target block matrix based on an inverse matrix of the first submatrix and the summation matrix; and
   determining a first target row of the target block matrix as a reconstructed first block.

3. The method according to claim 1, wherein before the reconstructing the first block based on the first results from the target quantity of storage devices and the first submatrix, the method further comprises:
   sending a first obtaining request to a storage device of the target quantity of storage devices corresponding to each second submatrix, wherein the first obtaining request comprises the second submatrix corresponding to the storage device, block information of a third block corresponding to each column of the second submatrix, and an identifier of a control device; and
   obtaining the first results returned by the target quantity of storage devices based on the first obtaining request.

4. The method according to claim 1, wherein after the reconstructing the first block based on the first results from the target quantity of storage devices and the first submatrix, the method further comprises:
   sending a write request to a target storage device, wherein the write request comprises the reconstructed first block and block information of the reconstructed first block, and the target storage device stores the reconstructed first block based on the block information of the reconstructed first block.

5. The method according to claim 4, wherein before the sending the write request to the target storage device, the method further comprises:
   obtaining the second block from a storage device of the target quantity of storage devices that stores the second block;
   reconstructing the second block based on the first results from the target quantity of storage devices and the first submatrix; and
   if a reconstructed second block is the same as the obtained second block, performing the sending the write request to the target storage device; otherwise, skipping performing the sending the write request to the target storage device, and preventing use of the first stripe.

6. The method according to claim 1, wherein before the reconstructing the first block based on the first results from the target quantity of storage devices and the first submatrix, the method further comprises:
   sending a second obtaining request to the storage device of the target quantity of storage devices corresponding to each second submatrix, wherein the second obtaining request comprises the second submatrix corresponding to the storage device, block information of a third block corresponding to each column of the second submatrix, and an identifier of a target storage device;
   sending a target reconstruction request to the target storage device, wherein the target reconstruction request comprises the first submatrix, and the target reconstruction request indicates to reconstruct the first block based on the first submatrix; and receiving a reconstruction completion response sent by the target storage device, wherein the reconstruction completion response indicates that the first block is completely reconstructed.

7. The method according to claim 1, wherein before the determining the first block in the lost block in the first stripe, the method further comprises:

receiving a first reconstruction request, wherein the first reconstruction request comprises a storage medium identifier of an invalid storage medium on a storage device of the target quantity of storage devices;

determining at least one second stripe based on the storage medium identifier in the first reconstruction request; and determining any stripe in the at least one second stripe as the first stripe, and wherein the determining the first block in the lost block in the first stripe comprises:

determining any block in the lost block in the first stripe as the first block based on the storage medium identifier.

8. The method according to claim 1, wherein before the determining the first block in the lost block in the first stripe, the method further comprises:

receiving a second reconstruction request, wherein the second reconstruction request comprises block information of at least one block lost in a storage medium on a storage device of the target quantity of storage devices;

determining at least one second stripe based on the block information of the at least one block in the second reconstruction request; and determining any stripe in the at least one second stripe as the first stripe, and wherein the determining the first block in the lost block in the first stripe comprises:

determining any block in the lost block in the first stripe as the first block based on the block information of the at least one block in the second reconstruction request.

9. A computer device comprising:

a memory configured to store instructions; and a processor coupled to the memory and configured to perform operations, the operations comprising:

determining a first block in a lost block in a first stripe, wherein a block in the first stripe is stored by a target quantity of storage devices;

splitting a check matrix of the first stripe into a first submatrix and a target quantity of second submatrices, wherein the first submatrix comprises a column corresponding to the first block and a column corresponding to a second block, each second submatrix comprises a column corresponding to at least one third block, stored on one storage device, in the first stripe, the second block is any block in the stored valid block in the first stripe, and the at least one third block is any block other than the second block in the stored valid block;

obtaining a first result from each of the target quantity of storage devices, wherein each first result is obtained after one of the target quantity of storage devices reads a stored valid block in the first stripe and performs calculation based on the stored valid block that is read, wherein an amount of data of the first result is less than that of a unlost block in the first stripe; and reconstructing the first block based on the first results from the target quantity of storage devices and the first submatrix.

10. The device according to claim 9, wherein the reconstructing the first block based on the first results from the target quantity of storage devices and the first submatrix comprises:

summing the first results from the target quantity of storage devices to obtain a summation matrix;

obtaining a target block matrix based on an inverse matrix of the first submatrix and the summation matrix; and determining a first target row of the target block matrix as a reconstructed first block.

11. The device according to claim 9, wherein before the reconstructing the first block based on the first results from the target quantity of storage devices and the first submatrix, the operations further comprise:

sending a first obtaining request to a storage device of the target quantity of storage devices corresponding to each second submatrix, wherein the first obtaining request comprises the second submatrix corresponding to the storage device, block information of a third block corresponding to each column of the second submatrix, and an identifier of a control device; and obtaining the first results returned by the target quantity of storage devices based on the first obtaining request.

12. The device according to claim 9, wherein after the reconstructing the first block based on the first results from the target quantity of storage devices and the first submatrix, the operations further comprise:

sending a write request to a target storage device, wherein the write request comprises the reconstructed first block and block information of the reconstructed first block, and the target storage device stores the reconstructed first block based on the block information of the reconstructed first block.

13. The device according to claim 12, wherein before the sending the write request to the target storage device, the operations further comprise:

obtaining the second block from a storage device of the target quantity of storage devices that stores the second block;

reconstructing the second block based on the first results from the target quantity of storage devices and the first submatrix; and if a reconstructed second block is the same as the obtained second block, performing the sending the write request to the target storage device; otherwise, skipping performing the sending the write request to the target storage device, and preventing use of the first stripe.

14. The device according to claim 9, wherein before the reconstructing the first block based on the first results from the target quantity of storage devices and the first submatrix, the operations further comprise:

sending a second obtaining request to the storage device of the target quantity of storage devices corresponding to each second submatrix, wherein the second obtaining request comprises the second submatrix corresponding to the storage device, block information of a third block corresponding to each column of the second submatrix, and an identifier of a target storage device;

sending a target reconstruction request to the target storage device, wherein the target reconstruction request comprises the first submatrix, and the target reconstruction request indicates to reconstruct the first block based on the first submatrix; and receiving a reconstruction completion response sent by the target storage device, wherein the reconstruction completion response indicates that the first block is completely reconstructed.

15. The device according to claim 9, wherein before the determining the first block in the lost block in the first stripe, the operations further comprise:
  receiving a first reconstruction request, wherein the first reconstruction request comprises a storage medium identifier of an invalid storage medium on a storage device of the target quantity of storage devices;
  determining at least one second stripe based on the storage medium identifier in the first reconstruction request; and
  determining any stripe in the at least one second stripe as the first stripe, and
  wherein the determining the first block in the lost block in the first stripe comprises:
  determining any block in the lost block in the first stripe as the first block based on the storage medium identifier.

16. The device according to claim 9, wherein before the determining the first block in the lost block in the first stripe, the operations further comprise:
  receiving a second reconstruction request, wherein the second reconstruction request comprises block information of at least one block lost in a storage medium on a storage device of the target quantity of storage devices;
  determining at least one second stripe based on the block information of the at least one block in the second reconstruction request; and
  determining any stripe in the at least one second stripe as the first stripe, and
  wherein the determining the first block in the lost block in the first stripe comprises:
  determining any block in the lost block in the first stripe as the first block based on the block information of the at least one block in the second reconstruction request.

17. A non-transitory machine-readable storage medium having instructions stored therein, which when executed by a processor, cause the processor to perform operations, the operations comprising:
  determining a first block in a lost block in a first stripe, wherein a block in the first stripe is stored by a target quantity of storage devices;
  splitting a check matrix of the first stripe into a first submatrix and a target quantity of second submatrices, wherein the first submatrix comprises a column corresponding to the first block and a column corresponding to a second block, each second submatrix comprises a column corresponding to at least one third block, stored on one storage device, in the first stripe, the second block is any block in the stored valid block in the first stripe, and the at least one third block is any block other than the second block in the stored valid block;
  obtaining a first result from each of the target quantity of storage devices, wherein each first result is obtained after one of the target quantity of storage devices reads a stored valid block in the first stripe and performs calculation based on the stored valid block that is read, wherein an amount of data of the first result is less than that of a unlost block in the first stripe; and
  reconstructing the first block based on the first results from the target quantity of storage devices and the first submatrix.

18. The non-transitory machine-readable storage medium according to claim 17, wherein the reconstructing the first block based on the first results from the target quantity of storage devices and the first submatrix comprises:
  summing the first results from the target quantity of storage devices to obtain a summation matrix;
  obtaining a target block matrix based on an inverse matrix of the first submatrix and the summation matrix; and
  determining a first target row of the target block matrix as a reconstructed first block.

19. The non-transitory machine-readable storage medium according to claim 17, wherein before the reconstructing the first block based on the first results from the target quantity of storage devices and the first submatrix, the operations further comprise:
  sending a first obtaining request to a storage device of the target quantity of storage devices corresponding to each second submatrix, wherein the first obtaining request comprises the second submatrix corresponding to the storage device, block information of a third block corresponding to each column of the second submatrix, and an identifier of a control device; and
  obtaining the first results returned by the target quantity of storage devices based on the first obtaining request.

* * * * *